US009141997B2

(12) United States Patent
Gaedcke et al.

(10) Patent No.: US 9,141,997 B2
(45) Date of Patent: Sep. 22, 2015

(54) SYSTEM AND METHOD FOR PROVIDING A SOCIAL CUSTOMER CARE SYSTEM

(71) Applicant: Lithium Technologies, Inc., Emeryville, CA (US)

(72) Inventors: Dewey Gaedcke, Austin, TX (US); Phu Nguyen, Austin, TX (US); James David Evans, Austin, TX (US); Morten Moeller, Austin, TX (US)

(73) Assignee: Lithium Technologies Inc., San Francisco, CA (US)

( * ) Notice: Subject to any disclaimer, the term of this patent is extended or adjusted under 35 U.S.C. 154(b) by 0 days.

(21) Appl. No.: 13/865,411

(22) Filed: Apr. 18, 2013

(65) Prior Publication Data
US 2014/0278785 A1 Sep. 18, 2014

Related U.S. Application Data

(63) Continuation of application No. 13/835,250, filed on Mar. 15, 2013, and a continuation of application No. 13/835,502, filed on Mar. 15, 2013.

(60) Provisional application No. 61/636,132, filed on Apr. 20, 2012.

(51) Int. Cl.
*G06Q 30/02* (2012.01)
*G06Q 50/00* (2012.01)
*G06Q 30/00* (2012.01)

(52) U.S. Cl.
CPC ............... *G06Q 50/01* (2013.01); *G06Q 30/01* (2013.01); *G06Q 30/016* (2013.01); *G06Q 30/0203* (2013.01); *G06Q 30/0207* (2013.01); *G06Q 30/0241* (2013.01)

(58) Field of Classification Search
CPC .......... G06Q 30/0201; G06Q 30/0203; G06F 17/30598; G06F 17/30705; G06F 17/2785; G06F 17/30864; G06F 17/27; G06F 17/2765; G06F 17/277
USPC ....................................................... 705/7.32
See application file for complete search history.

(56) References Cited

U.S. PATENT DOCUMENTS 8,131,745 B1 * 3/2012 Hoffman et al. ............... 707/766
8,825,515 B1 * 9/2014 Hanson ........................ 705/7.32

(Continued)

OTHER PUBLICATIONS

Raju, "5 Ways to Tweet More Than 140 Characters," Dec. 28, 2008, Technically Personal, http://www.techpp.com/2008/12/28/5-ways-to-tweet-more-than-140-characters/, retrieved from Internet Archive version from Mar. 3, 2011.*

(Continued)

*Primary Examiner* — Ivan R Goldberg
(74) *Attorney, Agent, or Firm* — Taylor Russell & Russell, P.C.

(57) ABSTRACT

The present invention relates to social customer service and support systems integrated with social media and social networks. More particularly, the invention provides a social customer care platform system to allow customer care functions, and in particular to allow customer service agents to identify, prioritize, match and triage customer support requests that may arise through a social network and may be serviced using a social network. It manages and tracks a high-volume of customer interactions and provides for monitoring of Internet social network posts relevant to a business's products or services along with the ability to capture, monitor, filter, make sense of and respond to, in near real-time, tens of thousands of social interactions. It comprises role specific user-interface and functionality for social customer service and support environments, automated prioritization and matching for increased agent productivity, and an automated enterprise workflow to align social media support with existing business processes.

17 Claims, 30 Drawing Sheets

(56) References Cited

U.S. PATENT DOCUMENTS

| | | |
|---|---|---|
| 2009/0106080 A1* | 4/2009 | Carrier et al. .................. 705/10 |
| 2009/0210282 A1* | 8/2009 | Elenbaas et al. ................. 705/9 |
| 2010/0169148 A1* | 7/2010 | Oberhofer et al. ............... 705/9 |
| 2010/0205663 A1* | 8/2010 | Ward et al. ...................... 726/7 |
| 2010/0246797 A1* | 9/2010 | Chavez et al. ........... 379/265.02 |
| 2010/0312769 A1* | 12/2010 | Bailey et al. ................... 707/740 |
| 2011/0077988 A1* | 3/2011 | Cates et al. ................... 705/7.32 |
| 2011/0125826 A1* | 5/2011 | Erhart et al. ................... 709/202 |
| 2011/0276513 A1* | 11/2011 | Erhart et al. ................... 705/347 |
| 2012/0036080 A1* | 2/2012 | Singer et al. ................... 705/319 |
| 2012/0195422 A1* | 8/2012 | Famous ................... 379/265.09 |
| 2012/0232953 A1* | 9/2012 | Custer ......................... 705/7.32 |
| 2012/0265806 A1* | 10/2012 | Blanchflower et al. ....... 709/204 |
| 2012/0303659 A1* | 11/2012 | Erhart et al. ................... 707/769 |
| 2012/0317198 A1* | 12/2012 | Patton et al. ................... 709/204 |
| 2013/0110946 A1* | 5/2013 | Bradshaw ..................... 709/206 |

OTHER PUBLICATIONS

Dai, "SoMEST—A Model for Detecting Competitive Intelligence from Social Media," 2011, Proceedings of the 15th International Academic MindTrek Conference: Envisioning Future Media Environments, ACM, pp. 241-248.*

Lithium Website, http://www.lithium.com, Dec. 11, 2010, retrieved from Internet Archive, pp. 1-10.*

* cited by examiner

Figure 5 Agent Desktop

Figure 7 Response with Knowledge Base

Figure 8 Response Portal

Figure 9 Conversation Threading and Audit Trail

Figure 10 Agent Desktop – Social Media Response

Figure 11 Supervisor Desktop

Figure 12 One-to-Many Responses

Figure 13 Manager Dashboard

Figure 22

Example scoring model

| Attribute name or combination | points to assign when matched |
|---|---|
| email | 1000 |
| phone | 1000 |
| last | 60 |
| first | 30 |
| date of birth | 50 |
| hometown | 25 |
| zip | 90 |
| last, first, zip, dob | 800 |

| Customer Options 2901 |
|---|
| See entire conversation thread (excluding private messages) 2902 |
| Authenticate to the source (communication conduit) site, in order to see private messages 2903 |
| Answer a survey or other questionnaire 2904 |
| Claim and consume a coupon or special offer 2905 |
| Download and read a knowledge-based article or other attachment provided by the CSR 2906 |
| Respond back to the CSR as the next step in the discussion 2907 |
| Search the provided knowledge-base for other articles or related solutions 2908 |
| Request community (known as swarming) support in answering or weighing in on the problem 2909 |

SYSTEM AND METHOD FOR PROVIDING A SOCIAL CUSTOMER CARE SYSTEM

BACKGROUND

Customer relationship management (CRM) systems for customer care are used to manage businesses' interactions their customers. CRM software systems are designed to help reduce costs and increases profitability by solidifying customer loyalty. Effective CRM systems bring together information from all data sources within an organization (and where appropriate, from outside the organization) to give one, holistic view of each customer in real-time. This allows customer facing employees in such areas as sales, customer support, and marketing to make quick yet informed decisions on everything from cross-selling and upselling opportunities to target marketing strategies to competitive positioning tactics.

The explosion in social media and social networks is changing the way people connect and communicate, much of it occurring in real-time and near-real-time. As used herein, "social media" and the "social web" encompass and include any or all online services and networked technologies (such as social networks, blogs, forums, microblogs, review sites, news sites and surveys), in which consumers and customers are permitted or encouraged to communicate, share, publish or review ideas, product, people or other subjects among one or more collaborators. The content generated within these technologies is called user-generated content. As used herein "real-time" means the real-time and near real-time enabling of users to receive information over the web as soon as it is published by its authors. Millions of Internet-based social interactions occur daily and large subsets of those interactions involve product service or support problems currently being experience by customers. Social media is disrupting customer care in that demographic shifts have caused phone support to be used only as a last resort. There are an ever increasing number of ways that customers request support which results in multiple social network and traditional support channels that need to be serviced by a business. Furthermore, customers have discovered they get better support when they complain publicly and visibly. Legacy CRM systems were built around phone as the core support channel and are not well-suited to processing and organizing social network information. This often results in bad user experiences that cause negative publicity and missed opportunities to have positive and visible interactions with customers and prospects.

In addition, there is an increasing use of online Internet support communities (sometimes called peer-to-peer support) that allow customers to self-service support problems by searching knowledge bases or web-content for their problem and posted solutions or by asking questions on-line and getting support from another user. Customers that care about their brand and servicing customer realize that they should monitor and participate in these Internet support social media communities and integrating social media data into their CRM and customer support systems.

Social CRM attempts to integrate social websites and related technology into traditional CRM systems to provide another way for businesses to connect with customers and prospects. Social CRM that provides customer support differs from most of the existing social media solutions that have been designed for marketing, that is, connecting with prospects and existing customers to sell new products and solutions, and not designed for use by a customer service agent to provide customer service and support.

SUMMARY

Social peer-to-peer class CRM systems allow customers to answer each other's support questions without contacting a customer service representative by providing a website and infrastructure that allows a user to post questions about a business's product and to receive support answers from other third party users who are usually not affiliated with the business.

However there is still a need to provide agent-based support to answer customers and prospects support questions arising on the social web. Many consumers know that they get better service by posting their questions, complaints and support requests on Internet social networks. The agent trying to provide this type of support is faced with a myriad of issues. The support questions may be in the form of unstructured Internet website posts streaming in with no associated priority or relevance. There may be no visibility as to whether a post has already been answered or if it is part of an ongoing conversation (also known as a "thread"). It may not be known if the support post is from an existing customer since there is usually no means to connect a social "handle" (a user's web name) to a customer CRM database record. To add to the difficulties of communicating efficiently in a social network support environment, some social network communication conduits restrict the length or content of messages and do not allow file attachments and the like.

In order to service such requests, an agent is forced to use multiple point solutions that often include re-keying and retyping information into different and unrelated social communication tools. In addition, the agent may not be able to easily access and see related knowledge-based articles or other existing answers to a particular customer support problem. Customer support responses to customers frequently contain procedural steps and knowledge-based articles which can exceed the data and message constraints of the Internet social network. The agent is frequently unable to easily convert the customer's identity on a social network (Twitter and Facebook for example) into a valid customer email address in order to respond directly back to the customer so the agent is obligated to respond to customers via the communication conduit from which they initiate the support request. This means that the data and message constraints of that communication conduit could prevent an agent from providing a complete answer to the customer's question.

Because of the lack of visibility into what questions have existing answers which can be pushed out to the customer and whether a post has already been claimed by an agent and being addressed, an agent's managers are not able to effectively scale the workload or to prioritize and reassign work across the team. There also are issues with measuring the success of social efforts in general since there are no real-time metrics across agents and workgroups, no integration with business intelligence or related systems and no easy ways to understand the overall work flows and resource allocation. This also results in a limited ability to view an agent's individual and group contributions. Furthermore, unlike traditional call-center systems, there may be no way to take a customer satisfaction survey to report a good or bad service experience, to provide feedback or to rank and report on service, or to allow the business to publish good answers to questions for other consumers to access when using the social network communication conduits from which the support request was initiated.

The present solution solves these problems. The solution relates to customer relationship management systems integrated with social media (including forums and blogs) and social networks. More particularly, the invention provides a social customer care platform system and method to allow customer care functions, and in particular customer service agents to identify, prioritize, match and triage customer support requests that may arise through a social network and may be serviced using a social network. It is designed to be able to serve high-volume of customer interactions. It provides a system and method to retrieve (also known as "harvesting") data from multiple "listening" or aggregator services, that monitor Internet social networks for posts relevant to a business's products or services. After the present system receives data from an Internet source site or aggregator, it is able to capture, monitor, filter, make sense of and respond to, in real-time, tens of thousands of social interactions. It comprises role specific user-interfaces and functionality to match customer service environments, automated prioritization and matching for increased agent productivity, and an automated enterprise workflow to align social media support with existing business processes. The solution provides the ability to connect specific aspects of agent performance with customer satisfaction and use the answers or other communications provided by the agent through the solution. By providing this integrated environment, the social customer care system reduces customer servicing costs and provides rapid real-time responses that may be measured according to the company's service level agreement (SLA) response requirements.

The solution comprises a social customer care system and method that is a real-time system with continuous self-learning, designed to discern the context of each social interaction and automatically determine how to best respond. It can be delivered as a SaaS-based data service technology platform. It has a social platform with an enterprise workflow that has a customer support forum in the form of an agent response interface that integrates with a knowledge base and other applications that a company uses to manage customers, products and services. The workflow allows for matching, prioritization, workgroup management and routing of customer care requests and problems from social media websites. It provides for agent engagement, knowledge base information automation and finally, expert agent engagement when necessary. The system integrates with existing CRM systems to access customer records and makes the results of the social care interaction available to the CRM systems and to marketing intelligence systems.

The social customer care system and method comprises an agent desktop that integrates incoming information from social media sources and conduits with a knowledge base and templates of responses to similar types of problems. It provides advanced visualization tools and automatically prioritizes each post. The prioritization process includes a real-time, advanced triage process for the contact center to surface social interactions that are worth an agent's time, with a complete framework for action (including research, response and reassignment) all in one place. It allows for reassignment of the social interaction (also known as the "conversation") to other agents and for the problem to be prioritized and re-prioritized as necessary. It also allows for automated prioritization and matching of the customer's problem with an agent to increase productivity and quality. It provides for communication with the customer through third party Internet communication conduits (for example, Twitter or Facebook). It also allows for delivery of enhanced communication with the customer through a response portal through which only the customer and an assigned customer service agent can see the parts of a conversation thread. It provides for integrated conversation threading and audit trail visibility to agents and their supervisors so they can view the full conversation with the customer at the present time or in the future. As a result, agents no longer have to "alt-tab" their way through disconnected applications, copy and paste across systems, and search silowed (stored) information.

It has a supervisor desktop that allows the agent's supervisor to view the agent's work and interaction, prioritize and measure the workgroup's performance. Included in that measurement is support for and tracking of key performance metrics or SLA performance targets that are company committed service-level-targets (for example, time to respond to a customer query) that confirm the company is meeting its business targets for service quality for social engagement. Additionally, the response portal allows the inclusion of customer satisfaction surveys or other questionnaires to measure an agent's SLAs.

The system and method also provides for a manager dashboard that can display and summarize aggregate statistics about all customer social media and agent interactions. Advance visualization tools assist managers in tracking system-level throughput and flow rates around key social media processes. The enterprise workflow includes a team workflow that supports 24/7 support requirements and distributed workgroups in multiple geographic areas. It identifies backlogs and potential backlogs and provides solutions to remedy. The social customer care solution can be integrated with listeners (customers, prospects), CRM systems and knowledge management databases. It can also be integrated with peer-to-peer support communities.

The core of the described application includes a SaaS-based data service technology platform that provides the following modules and associated functionality:

Enterprise Workflow—

This application provides the functionality for a configurable software as a service (SaaS) software application for setting up business rules and controlling and coordinating the actions of the modules of the social customer care system and method described herein and their interaction with the customer, social network websites, support forums, knowledge databases, customer records, CRM systems and marketing intelligence systems. It provides the workflow control for agent engagement, knowledge based automation and expert engagement for matching, prioritizing, controlling workgroups and routing of data and information within the social customer care system. The enterprise workflow also controls input to and output from external systems such as social networks, CRM systems, marketing intelligence systems. It controls access to data such as customer records, knowledge databases and local databases of information available to agents and other users of the social customer care system.

Customer Response Portal—

This application provides the functionality for the customer service agent to send a response to a customer via the customer's chosen social network communication conduit and still support a full response even though the communication conduit may have data and message length restrictions. The response portal is the public/external face of the system described herein, and, in addition to other features, it can act as a knowledge base of prior conversations so that existing solutions can be reused (aka self-help), without the cost of a support agent's involvement It allows customers to take a satisfaction survey or to otherwise rank and report on the service they have received. It does so by providing a shortened link back to a business-specific response portal provided by the solution where customers can see more details about the answer to their support request, view knowledge-based articles, see related posts and answers and answer questions about the material provided or the customer service agent's service. Parts of the response portal can be private and confidential for the particular customer and part of the response portal can be made available to the public as a knowledge source for others with similar problems.

Conversation Consolidation and Management—

This application provides the functionality for managing public comments about a product or brand. Public comments, particularly by influential customers or prospects may positively or negatively influence the reputation of a business or the reputation of its products and services. In the realm of customer service, to insure proper "closure" and a satisfied customer, all parts of the conversation should be visible and chronologically ordered for the agent. If escalation is required, the entire "conversation" (interaction) should be transferred as a cohesive unit. While private conversations in social media are bi-directional (aka "threaded"), the technologies used for public messaging (for example Twitter & blog postings) often operate using a broadcast format. Even in cases where posts and responses are threaded, the relatedness of information is not typically preserved by the listeners and scrapers that harvest the data prior to reaching the present system. As such, it's not easy to tell which unique social media posts in aggregate constitute a single conversation. To make matters worse, conversations with CSR's may switch social network channels, from Twitter to email as one example. The present system and method allows the detection with high probability that different messages from varied sources and usernames are all from the same individual and all part of the same larger conversation. By consolidating customer messages and interactions into one cohesive conversation, the customer service organization is provided a complete picture of a customer's present and historical interactions with their business.

The conversation consolidation and management function comprises a system and method for automatically locating, identifying, consolidating and managing public comments across Internet based social networks in a social network customer relationship management system comprising: inputting into memory a post created by a third party at an Internet social network site, the post having a third party's web name; determining if the third party's web name does not exist in a database accessible to the social network CRM system and if it does not, adding the third party's web name to the database; if the social network CRM system indicates there is an ongoing customer support conversation, performing an identification unification process across other Internet social network sites to find other posts from the third party; and attaching the other posts from the third party that are found on the other Internet social network sites to the ongoing customer support conversation.

The method further comprises if the third party's web name does not exist in the database accessible to the social network CRM system and has been newly added to the database, creating a new ongoing customer support conversation; and adding the new ongoing customer support conversation to an available queue for action by a customer support management representative. The method further comprises creating a third party unique identifier key that represents a third party's web name and the Internet social network on which the third party uses the third party's web name; and determining if the third party unique identifier key already exists in the database. If the third party unique key already exists in the database, setting a flag to indicate that the third party's web name has been verified. The third party unique key may be saved in the database. At least of one third party unique keys are accessed from the database and if ongoing customer support conversations exist for this handle (user/third party web name), the ongoing customer support conversation is identified as being associated with the third party identified in the third party unique key. The identification unification function and processing can be performed prior to inputting into memory the third party post to locate, identify and unify user profiles across Internet-based social network websites.

Dynamic Scoring Based on Customer Business Context—

This application provides the functionality for placing customer comments about the products and services of a business in-context. For example, "hot" food may be good while a "hot" laptop is not. The present system and method analyzes the business, its industry and related product categories using the business's own website and public web content. It forms conclusions using scoring heuristic algorithms that allow better prioritization and disambiguation of comments made about the business. Agents can validate or override scoring heuristics and the system self-learns to provide better customer service and responses.

Incentive Based Social Evangelism—

Product advertising is becoming less effective as customers turn to friends and social contacts for recommendations about products and services. In the advertising model, the carriers, such as television networks, billboards, magazines and the like, are paid for delivering advertising messages to the consumer. In the emerging model of social evangelism, consumers assume this role, can also be incentivized with compensation and can be empowered to pass on incentives to others. This application provides the functionality for an infrastructure to allow a business's customers to place a coupon generation widget or code snippet onto one or many webpages, such that their friends and colleagues see an offer that is recommended by someone they trust. Users can use the widget to print a custom, uniquely encoded (for closed-loop tracking) coupon, which gives them a discount or other benefit at the promoted merchant. Each time a friend or social contact uses (consumes) a coupon printed from one of the widgets, the consumer that posted the coupon may be given some form of compensation.

Identity Unification—

This application provides the functionality for allowing the social customer care system to use data from and existing user profile, called a known reference profile (KRP) from a customer database such as a CRM database or online social community to locate similar profiles across other social networks and database management systems. Statistical correlation algorithms use the data gathered to predict which profiles belong to the same individual. For example, a browser may be currently viewing a LinkedIn profile or CRM record of a known customer (the KRP). Upon command (such as clicking an available button or activating a pull-down menu), the system extracts key information about the customer from the previously existing profile such as name, address, hometown, birthdate, employer, college and the like. This system then uses certain values collected to search other social networking sites such as Facebook, Twitter, LinkedIn, Google Plus and the like for people with similar attributes. As each list of results comes back, the system extracts values from those found profiles as well. It then runs a similarity algorithm and predicts which profile from each additional site is most likely to be the same person. It stores this information in a database along with various scoring artifacts. Each time a different user runs the calculation, similar results are scored. There are at least three types of validation thresholds to determine the resulting similarity score. The first is having a high-enough correlation score resulting from the similarity algorithms. The second is having enough human reviews of the information to verify same identity. Finally, if none of the above two validation events occur and no human has indicated it is not the same person, then once a threshold of same matching hits occurs without the person being connected to someone else, the system assumes it is the same person and no further validation is required.

The identification unification function comprises a computer-implemented method for automatically locating, identifying and unifying user profiles comprising the steps of: inputting a user profile and designating the user profile as a search subject; extracting user-identifying data attributes from the user profile; searching at least one Internet-based social network website for users with profiles containing data attributes similar to the search subject user-identifying data attributes; identifying a social network site profile for a third party from the social network website based on a closeness of a match of social network site profile attributes for the third party to the search subject user-attributes; using the social network site profile attributes for the third party and the user-identifying attributes, running a scoring algorithm to produce a likelihood score that the third party and the search subject from the user profile is the same person; and if the likelihood score meets a certainty threshold criteria, using the social network site profile attributes for the third party and the user-identifying attributes in the user profile for the search subject to search additional Internet-based social network websites for data for the search subject based on the social network site profile attributes user profiles and the user-identifying data attributes running a scoring algorithm to produce a likelihood score that the third party and the search subject from the user profile is the same person.

The method further comprises computing a link relationship indicator that links the user profile for the search subject with the social network site profile for the third party. The method of further comprises repeating the searching, identifying and using steps for multiple Internet-based social network websites resulting in a total match score for each social network site profile identified on the respective Internet-based social network. The method can be used to locate, identify and unify user profiles across other databases such as CRM databases and other databases that contain user profile information.

Quickstart Process—

This application provides the functionality for scoring the relevancy and priority of product and brand "mentions" data taken from social media postings. It derives certain keywords to enhance the process of routing the matched posts to the correct workgroups or agents. It comprises allowing a weighted list of product-related words, phrases, model numbers and the like to be designated as domain specific vocabulary (DSV). The present system and method allows the DSV to be manually or automatically assembled to be able to configure the post/conversation scoring and routing process. This automated approach can occur in near-real-time and it is more efficient, in that it avoids errors associated with a manual approach. The system and method can begin with sparse data, for example, only the company name and its vertical industry. The application crawls the Internet, capturing related terms, phrases, model numbers, executive names, and other key data. Its algorithms cluster these terms according to frequency, indicators of positive or negative sentiment (sometimes known as "emotional tell's" and proximity to product or model names. After the clustering occurs, the application runs a second clustering algorithm (known as bi-clustering or co-clustering) to select and weight the terms for placement in the DSV. The results may be displayed for manual confirmation or adjustment by a human. Alternative, the results can automatically updated the DSV with the data derived from the process without human intervention.

Consumer Resolver Matching—

This application provides the functionality for finding existing prior consumers that have had the same problem solved as that being expressed by a new consumer. By putting two consumers together for peer-support, the company saves the costs associated with "agent" support.

BRIEF DESCRIPTION OF DRAWINGS

These and other features, aspects and advantages of the present invention will become better understood with regard to the following description, appended claims, and accompanying drawings wherein:

FIG. 22 is a table showing an exemplary score model of a scoring process of the identity unification processing of the social customer care system.

FIG. 29 is a table showing customer options while interacting with the response portal webpage of the social customer care system.

DETAILED DESCRIPTION OF INVENTION

Figure 1:
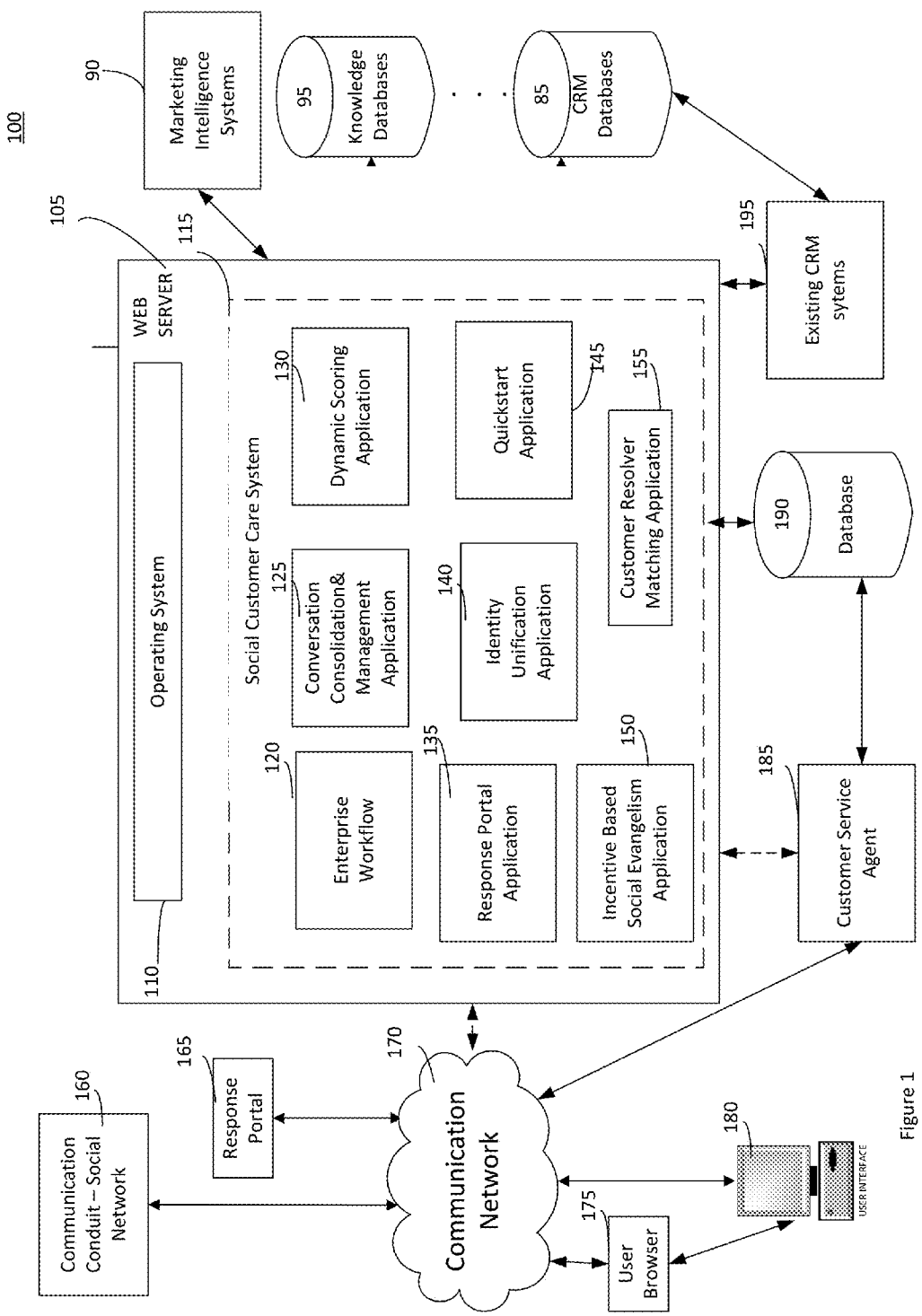
FIG. 1 illustrates a functional block diagram of an embodiment of the present invention.

FIG. 1 depicts a computer system and network 100 suitable for implementing the system and method of providing a social customer care system. A server computer 105 includes an operating system 110 for controlling the overall operation of the server 105 which may connect through a communications network 170 to one or more communication conduits (social networks) 160, a web-based response portal 165, a user's browser application 175 and local computers 180 having a user interface device. The server computer 105 hosts a software as a service (SaaS) application comprising the social customer care system platform 115. The server 105 can also be connected to a customer service agent 185 either through a local communication network or through the communication network 170. The server 105 allows for the connection of the social customer care system 115 to one or more existing CRM systems 195, marketing intelligence systems 90 and to commercial databases including knowledge databases 95 and CRM databases 85. The customer service agent 185 may also have access to local databases 190 that store various customer records and other information. The social customer care system 115 comprises multiple software applications including an enterprise workflow application 120, a response portal application 135, a conversation consolidation and management application 125, dynamic scoring application 130, an incentive based social evangelism application 150, an identity unification application 140, a quickstart process application 145 and a customer resolver matching application 155. The social customer care system 100 may operate in real-time to allow for immediate processing of and responses to customer entered questions and problems initiated at a social network communication conduit 160.

The enterprise workflow application 120 provides a configurable software application client for setting up business rules and controlling and coordinating the actions of the modules of the system and method of the social customer care system 115. The enterprise workflow also controls input to and output from external systems such as social networks 160, CRM systems 195, marketing intelligence systems 90 and controls access to data such as customer records that may reside in CRM databases 85, knowledge databases 95 and local databases 190 of information available to agents 185 and other users of the social customer care system.

The customer response portal 135 provides the functionality for the customer service agent 185 to send a response to a customer through a communication network 170 via the customer's chosen social network communication conduit 160. It allows a full response even though the communication conduit 160 may have data and message length restrictions. It allows for customers to take a survey or complete a questionnaire and to otherwise rank and report on service they have received. It does so by providing a shortened link back to a SaaS application web-hosted and business branded response portal 165 where customers can see more details about the answer to their support request, view knowledge-based articles, see related posts and answers and answer questions about the material provided or the customer service agent's service. Parts of the response portal 165 can be private and confidential for the particular customer and part of the response can be made available to the public.

The conversation consolidation and management application 125 provides the functionality for joining multiple public comments about a product or brand in one threaded conversation. Public comments, particularly by influential customers or prospects may positively or negatively influence the reputation of a business or the reputation of its products and services and thus have a large impact on the bottom line. In the realm of customer service, to insure proper "closure" and a satisfied customer, all parts of the conversation are visible and chronologically ordered. If escalation is required, the entire "conversation" (interaction) should be transferred as a cohesive unit. The present system and method allows the detection with high probability that different messages from varied sources such as social network communication conduits 160 and usernames are all from the same individual and all part of the same larger conversation. By consolidating customer messages and interactions into one cohesive conversation, the customer service organization is provided a complete picture of present and historical customer interactions with the business.

The dynamic scoring based on customer business context application 130 provides the functionality for placing customer comments about the products and services of a business in context. The present system and method analyses the business, its industry and related product categories using the business's own website and public web content. It forms conclusions using scoring heuristic algorithms that allow better prioritization and disambiguation of comments made about the business or its products and services. Agents 185 can validate or override scoring heuristics and the system self-learns to provide better customer service and responses.

The incentive based social evangelism application 150 provides the functionality to allow a brand's customers to place a coupon generation widget or code snippet onto one or many webpages, such that their friends and colleagues see an offer that is recommended by someone they trust. Users can use the widget to print a custom, uniquely encoded (for closed-loop tracking) coupon, which gives them a discount or other benefit at the promoted merchant. Each time a friend or social contact uses (consumes) a coupon printed from one of the widgets, the consumer that posed the coupon may be given some form of compensation.

The identity unification application 140 provides the functionality for allowing the social customer care system 115 to use data from an existing user profile, called a known reference profile (KRP) from a customer database such as a CRM database 85 or online social community to locate similar profiles across other social networks 160 and database management systems. Statistical correlation algorithms use the data gathered to predict which profiles belong to the same individual. For example, a browser may be currently viewing a LinkedIn Profile or CRM record of a known customer (the KRP). Upon command (such as clicking an available button or activating a pull-down menu), the application 175 extracts key information about the customer from the page such as name, address, hometown, birthdate, employer, college and the like. This application 175 then uses certain values collected to search other social networking sites 160 such as Facebook, Twitter, Google Plus and the like for people with similar names. As each list of results comes back, the identity unification application 140 extracts values from those found profiles as well. It then runs a similarity algorithm and predicts which profile from each additional site is most likely to be the same person. It stores this information in a database 190 along with various scoring artifacts. Each time a different client runs the calculation, similar results are scored. There are various types of validation thresholds. The first is a certain hit where a unique value found matches another unique value (such as a user's email address). The second is a high-enough correlation score resulting from initial equivalency type algorithms. The third is enough human reviews of the information to verify the same identity. Finally, if none of the above validation events occur and no human has indicated this is not the same person, then once a threshold of "same matching hits" occurs without the person being connected to someone else, the system assumes it is the same person and no further searching is required.

The quickstart process application 145 provides the functionality for scoring the relevancy and priority of product and brand mentions data taken from social media postings. It creates a weighted list of certain keywords to automate the process of routing social posts to the correct support agent or team. It comprises allowing a weighted list of product-related words, phrases, model numbers and the like to be designated as Domain Specific Vocabulary (DSV). The present system and method allows the DSV to be automatically assembled rather than manually assembled to be able to configure the scoring and routing process. Since this can occur in real-time it is more efficient, does not require manual labor and avoids errors associated with such manual labor. The system and method can begin with only company name and vertical industry of the company. The application crawls the Internet, capturing related terms, phrases, model numbers, executive names, and other key data. Its algorithms cluster these terms in buckets according to frequency, sentiment indicators and proximity to product or model names. After the clustering, the application runs a second clustering algorithm (bi-clustering or co-clustering) to select and weight the terms for placement in the DSV. The results may be displayed for manual confirmation or adjustment by a human 185 or the results can automatically update the DSV with the data derived from the process without human intervention.

The consumer resolver matching application 155 provides the functionality for finding other consumers that have had the same problem as that being faced by the current consumer. The two users can be connected directly for self-service and save the cost of a paid-agent resolution or the current consumer can be redirected to the solution documentation created for the original consumer. This content typically resides either in the knowledge base, the community forums or on the response portal (which is the public-view of the data contained in the whole system described herein).

Figure 2:
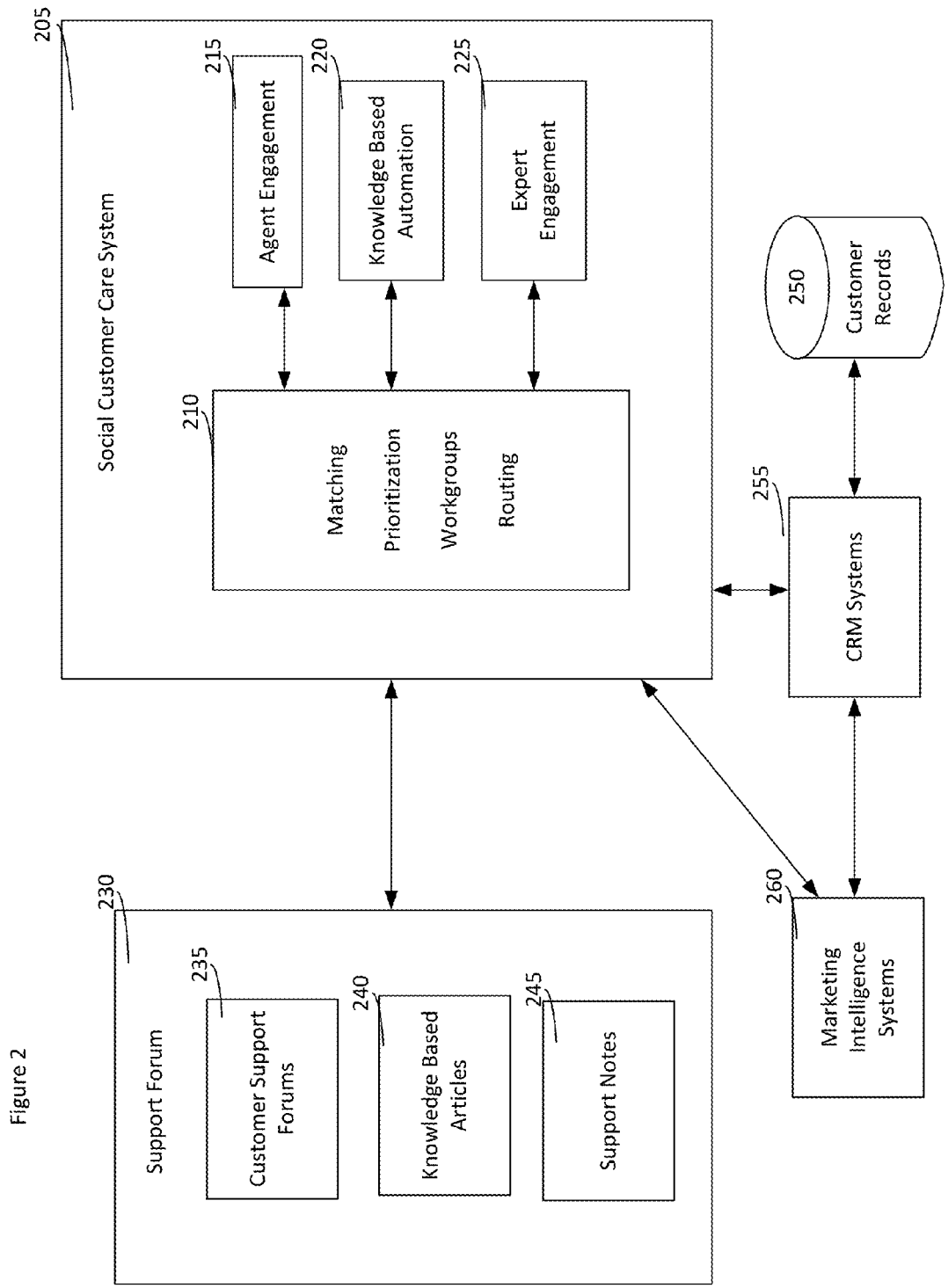
FIG. 2 illustrates a functional block diagram of an embodiment of the present invention.

FIG. 2 illustrates a functional block diagram 200 of an embodiment of the present invention. The social customer care system 205 and its enterprise workflow FIG. 1, 120 provide the functionality for matching, prioritization, workgroup management and routing 210 of customer care requests and problems from social media websites FIG. 1, 160. The social customer care system and method 205 may be a real time system with continuous self-learning capability, designed to discern the context of each social interaction and automatically determine the optimal support channel to provide the best customer service experience. It can be delivered as a SaaS-based data service technology platform. The social customer care system 205 provides for agent engagement 215, knowledge base information lookup automation 220 and expert agent engagement when necessary 225. The social customer care system 205 integrates with CRM systems 255 to allow access to customer records 250 and makes the results of the social care interaction available to the CRM systems 255 and to marketing intelligence systems 260. The social customer care system 205 uploads and downloads information to and from related support forums and applications 230 such as customer support forums 235, databases containing knowledge-based articles and information 240 and support notes 245 as well as from CRM applications.

Figure 3A:
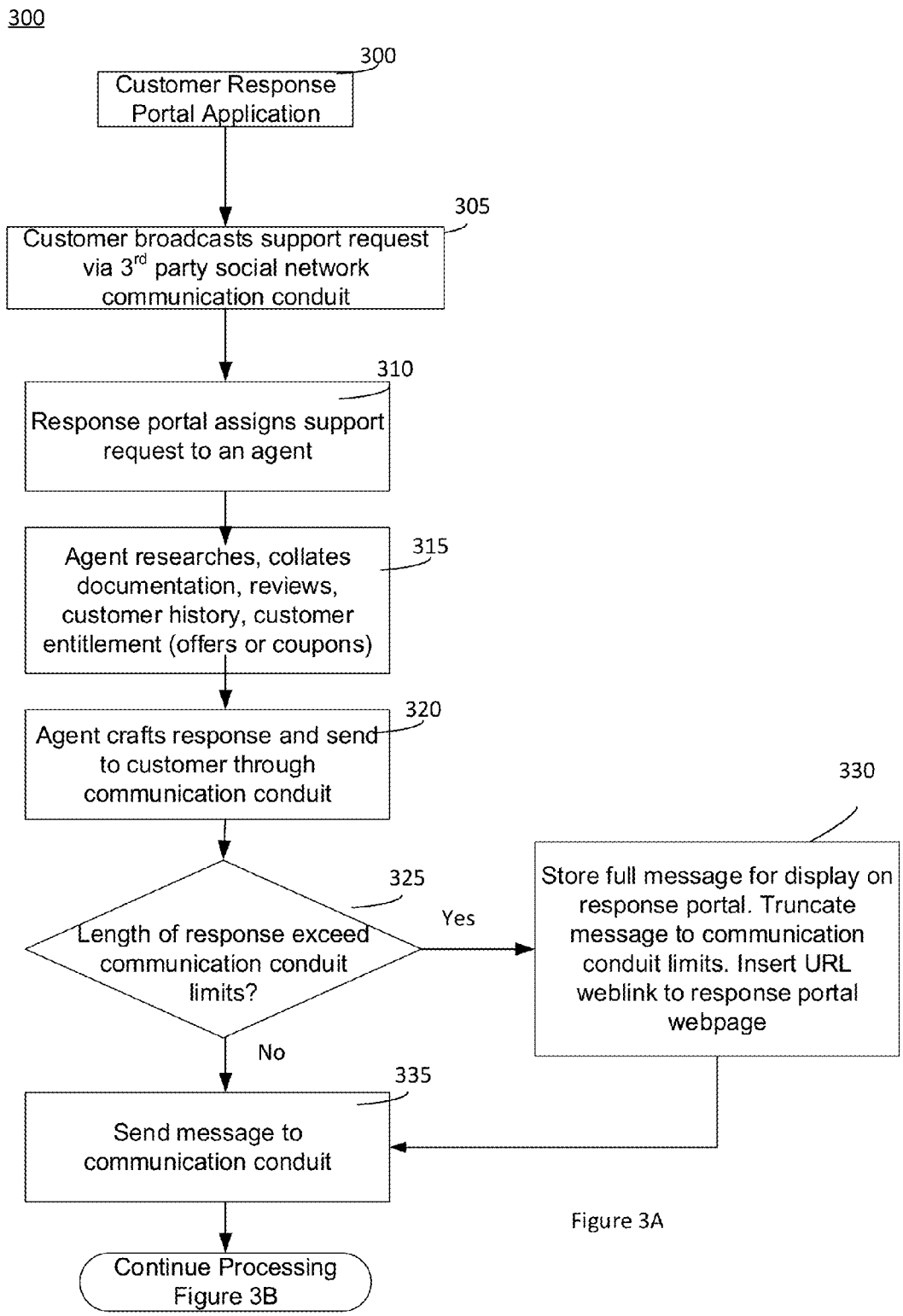
FIGS. 3A and 3B are flow diagrams of the customer response portal function processing.
Figure 3B:
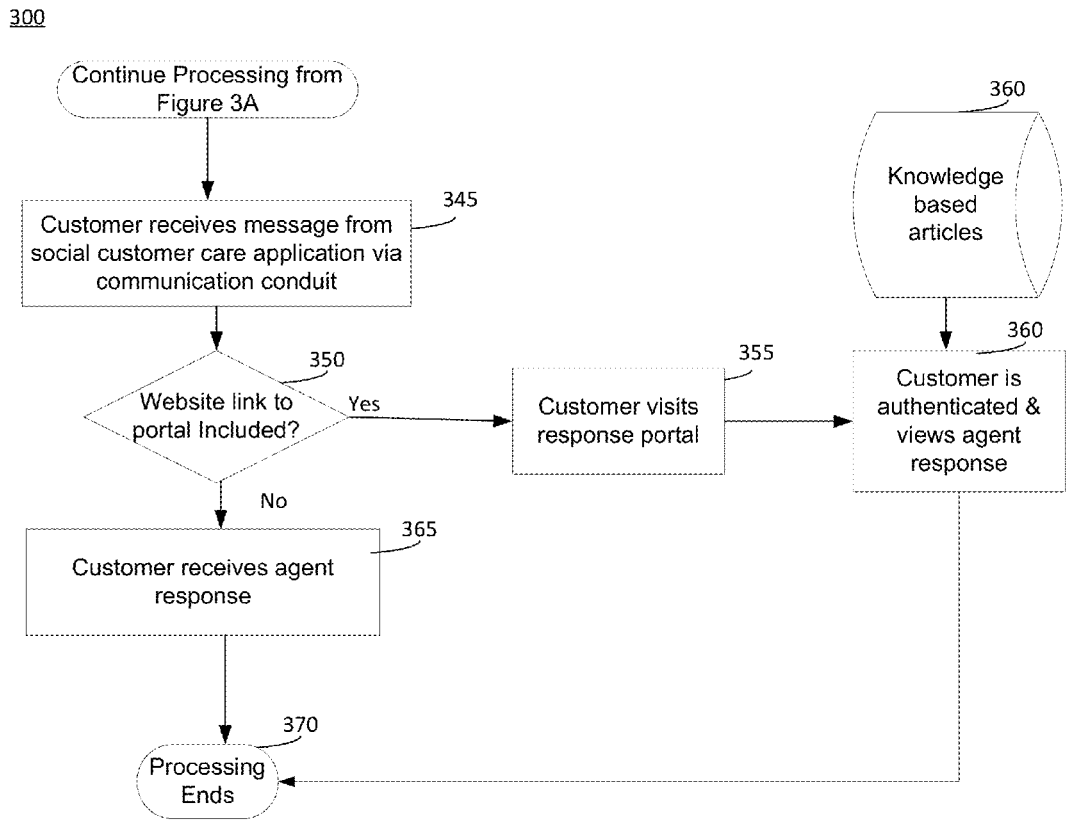

FIGS. 3A and 3B are flow diagrams of the customer response portal function processing 300. The customer response portal 300 includes a response function (or widget) in its web client user interface that acts as a broker to send agent responses through an application server which dispatches and tracks the responses to the third party communication conduit (for example Twitter, Facebook and the like). The customer response portal application 300 receives a broadcast of a support request from a customer via a third party social network communication conduit 305 and displays the threaded-history of a conversation that originated on the social-web, and occurred between the customer and the social support agent 305. The system response portal assigns and tracks the support request to an agent 310 by placing the post in an available queue so that the next available agent can claim it and begin the conversation. The agent researches, collates documentation, reviews, customer history and makes decisions about customer entitlement (offers or coupons) 315. The agent crafts a response and sends through the present system it to the customer via a social network communication conduit 320. All communication and other conversation history data is stored in the system database and is available for retrieval, processing or display by any of the system components. If the total length of the response exceeds the limits of the social network communication conduit 325, then the system's response portal function will store the full contents of the message for display on the response portal, truncate the message to comply with the limits of the communication conduit and insert a URL weblink to the response portal webpage 330 and processing continues in step 335 with the sending of the message to the social network communication conduit. The message recipient on the social network can click the URL to view the full conversation thread and message payload within the response portal. If total length of the response does not exceeds the limits of the social network communication conduit 325, then processing continues in step 335 with the sending of the message to the social network communication conduit. The message may include some or all of the following information: agent and user identification, specific identifies associated with this particular agent-customer communication, source address of the communication conduit, destination address (for example the customer's social network communication conduit account), full detailed response (or abbreviated response with link to a webpage response portal), threaded conversation history, links to knowledge based articles and the like.

In FIG. 3B, the customer receives the message from the social customer care application via the communication conduit 345. If the message contains a response portal website link 350, the customer visits response portal 355 and may need to be authenticated and then views the agent's response 360 plus a full thread of prior responses. The response could also include viewing knowledge based articles 360 or other functions as shown herein in FIG. 4 and processing ends 370. If the message contains all the support response, the customer receives the agent response 365 and processing ends 370.

Figure 4:
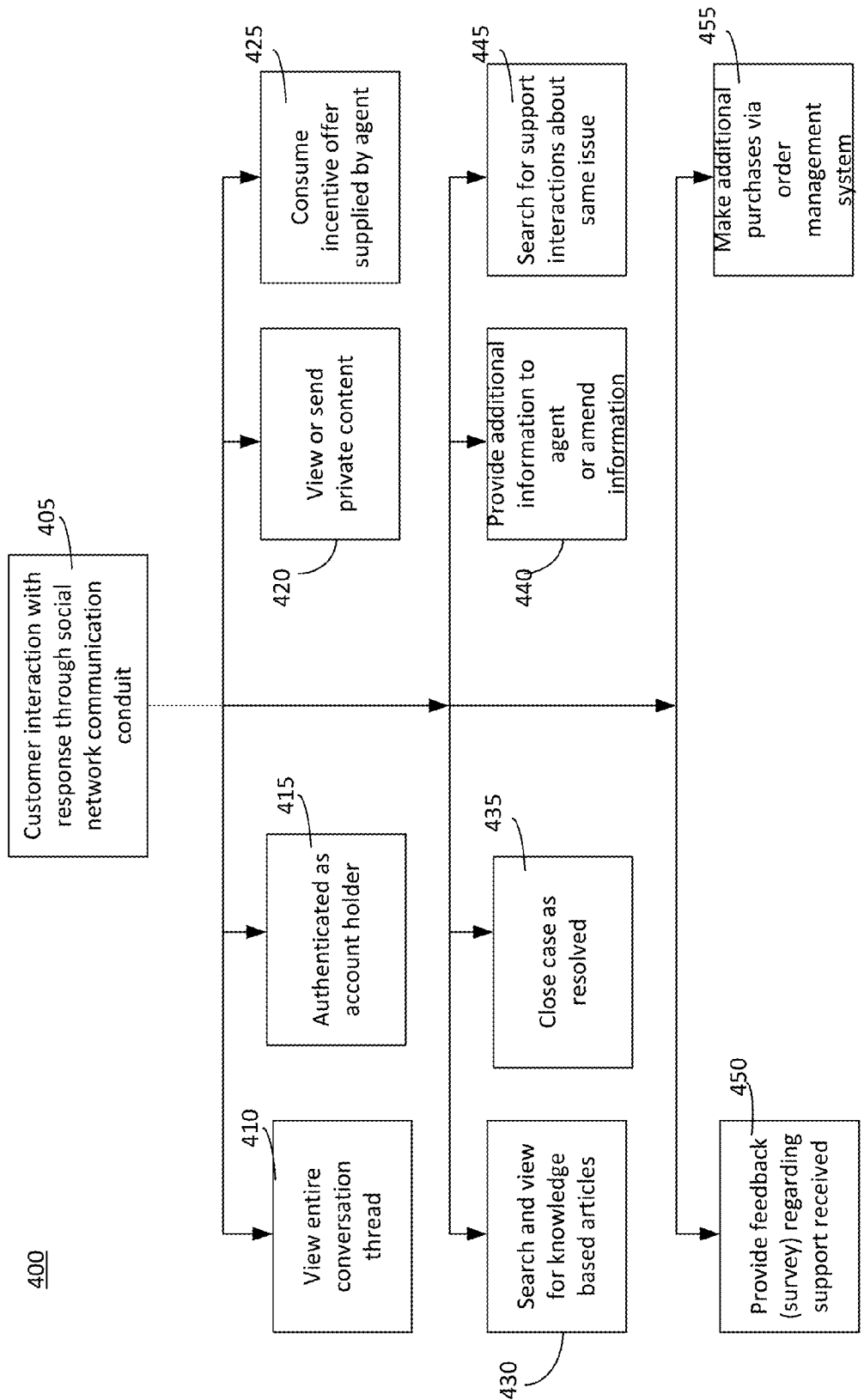
FIG. 4 is a diagram of customer interaction with an agent's response through social network communication conduits.

FIG. 4 is a diagram 400 of customer interaction with an agent's response through social network communication conduits 405. The customer interaction can be selected from the following actions:

Viewing the entire conversation thread 410;
Authenticating the customer as the communication conduit account holder 415;
Viewing or sending private content 420;
Consuming an incentive offer supplied by the agent 425;
Searching and viewing knowledge based articles 430;
Responding and closing the case as resolved 435;
Providing additional information to the agent or amending previously supplied information 440;
Searching for support interactions involving the same or similar issues 445;
Providing feedback via a survey or other means regarding the support the customer received 450; or
Making additional product purchases via an order management system interface connection that is provided to the customer 455.

Figure 5:
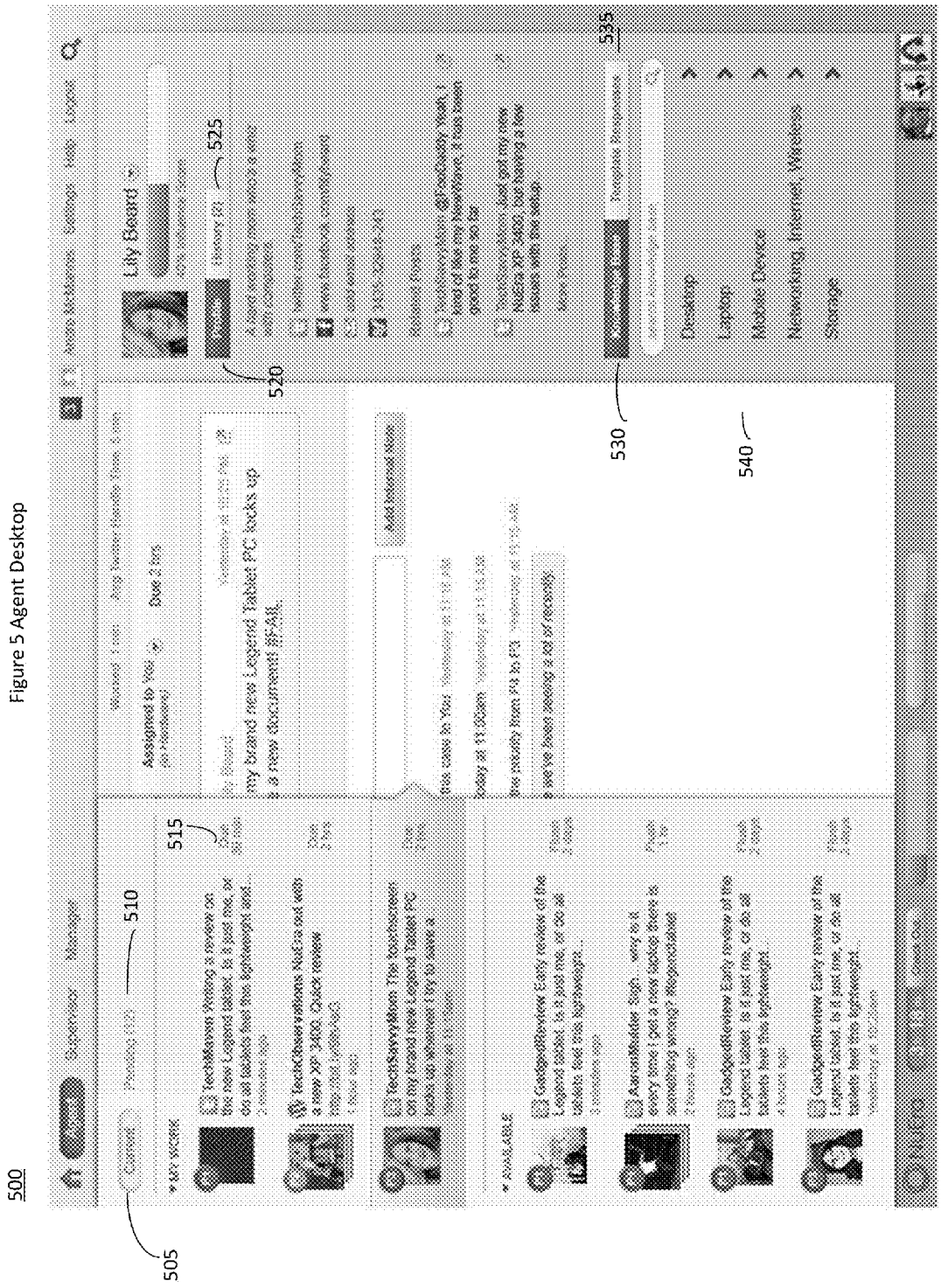
FIG. 5 is an exemplary depiction of an agent user interface of the social customer care system.

FIG. 5 is an exemplary depiction of an agent user interface of the social customer care system 500. It shows work assigned to the agent 505, pending support requests 510, due time and date 515, customer profile 520 for the current support request being processed and customer support request history 525. It includes links to a knowledge base 530 and template responses, in this case which are organized by computer or peripheral type (desktop, laptop, mobile device, networking, internet, wireless and storage) 540.

Figure 6:
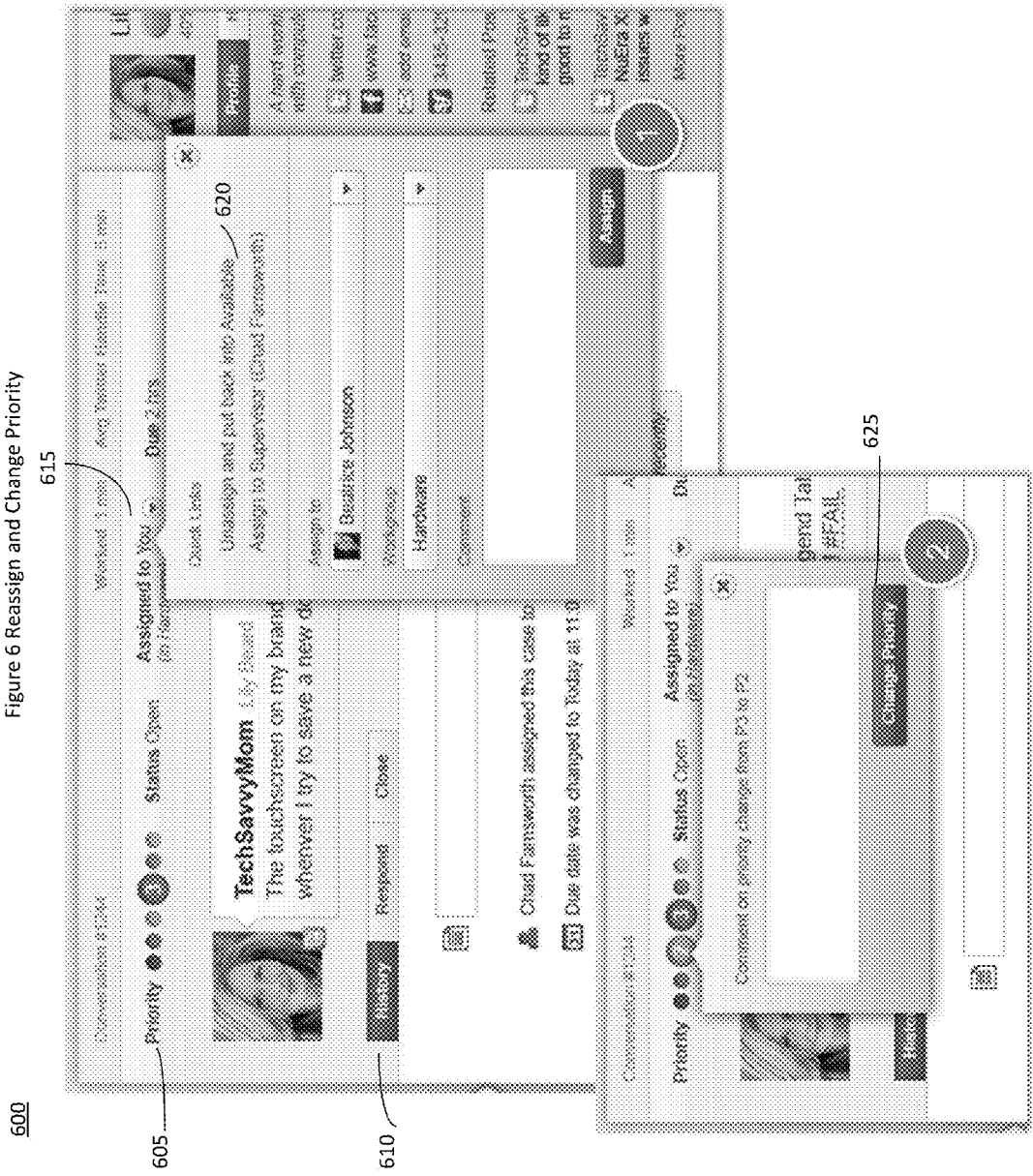
FIG. 6 is an exemplary depiction of an agent user interface of the social customer care system for reassigning and changing priority.

FIG. 6 is an exemplary depiction of an agent user interface of the social customer care system for reassigning and changing priority 600. The agent or manager user interface shows the current priority 605 of the support request, its history 610 and assignment 615. It provides the tools to reassign 620 and change the priority of the request 625.

Figure 7:
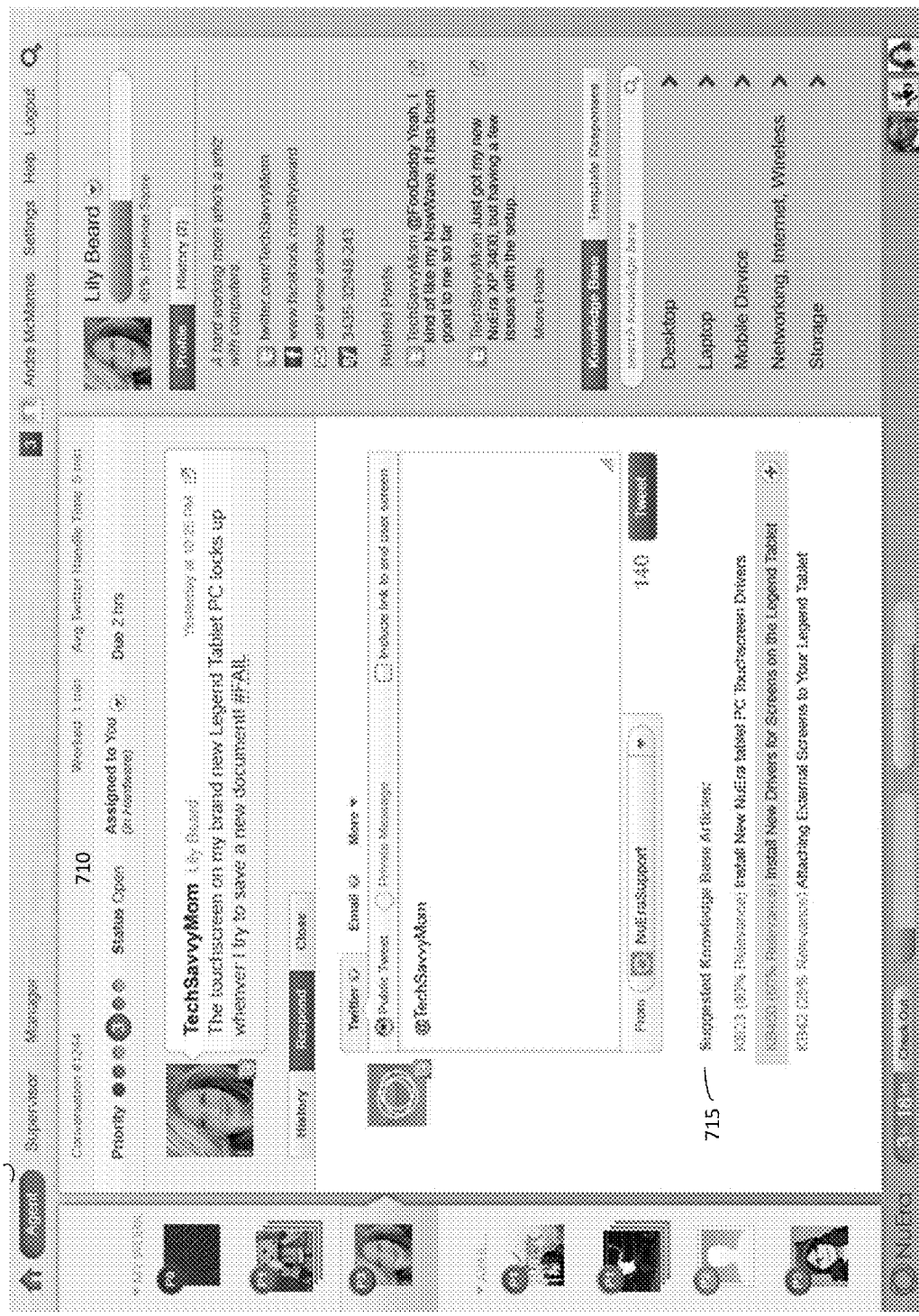
FIG. 7 is an exemplary depiction of a response with knowledge database information of the social customer care system

FIG. 7 is an exemplary depiction of a response with knowledge database information of the social customer care system 700. The agent user interface 705 depicts the current support request 710 and links to knowledge based articles 715 relevant to the support request.

Figure 8:
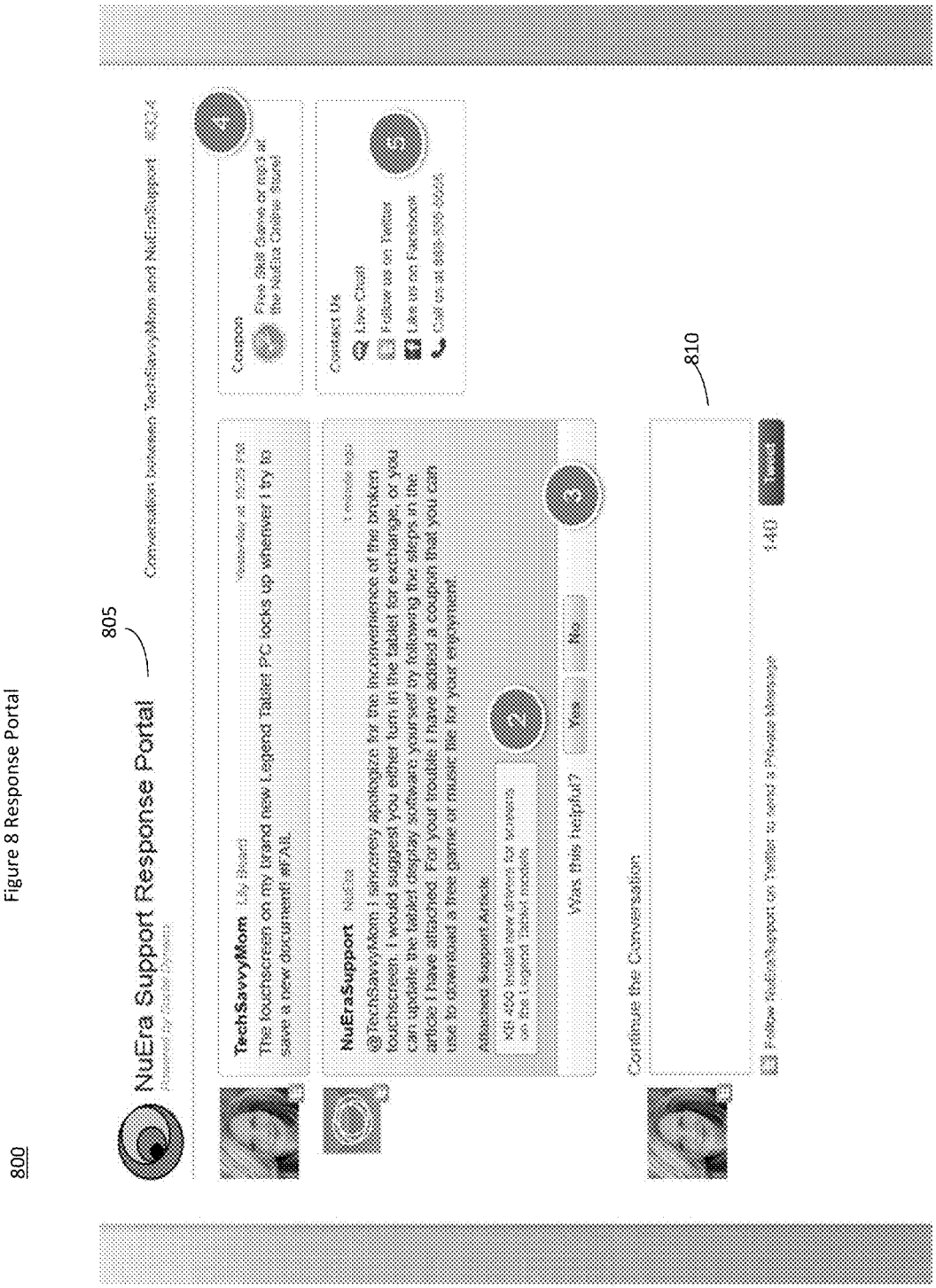
FIG. 8 is an exemplary depiction of a response portal of the social customer care system for responding to a customer problem initiated at a social network communication conduit.

FIG. 8 is an exemplary depiction of a response portal webpage of the social customer care system for responding to a customer problem initiated at a social network communication conduit 800. The response portal depicts what is displayed to the customer when the customer visits the response portal webpage 805 and views conversation thread (including agent answers) support request answer 810 which may for example include survey questions, promotional offers and methods of additional assistance specific to this customer interaction.

Figure 9:
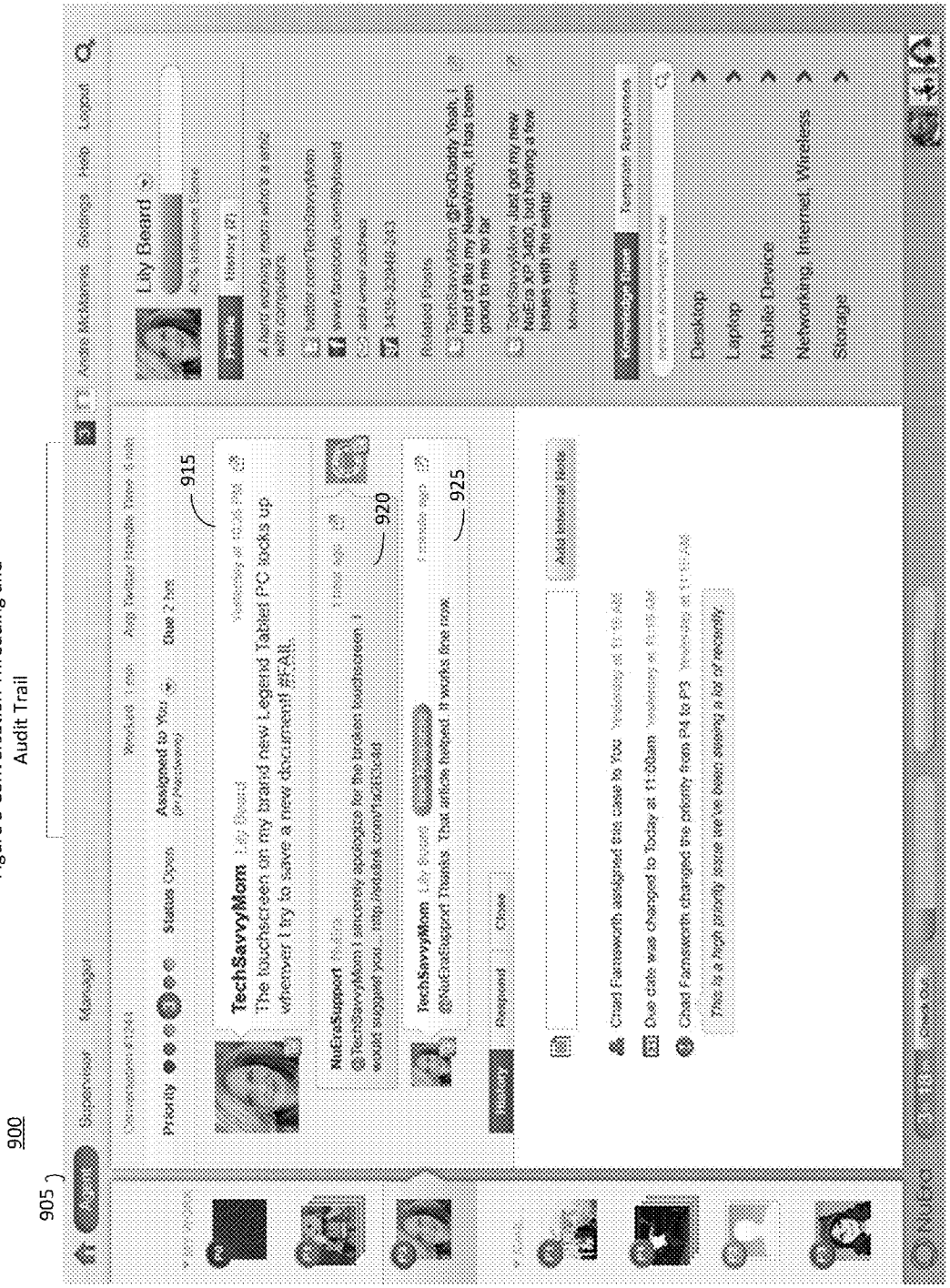
FIG. 9 is an exemplary depiction of a conversation thread and audit trail of the social customer care system.

FIG. 9 is an exemplary depiction of a conversation thread and audit trail of the social customer care system 900. The agent user interface 905 is able to display all conversation threads 910 so as to have an integrated picture of the customer support request and prior customer support requests 915, customer support agent responses 920 and any additional information entered by the customer 925.

Figure 10:
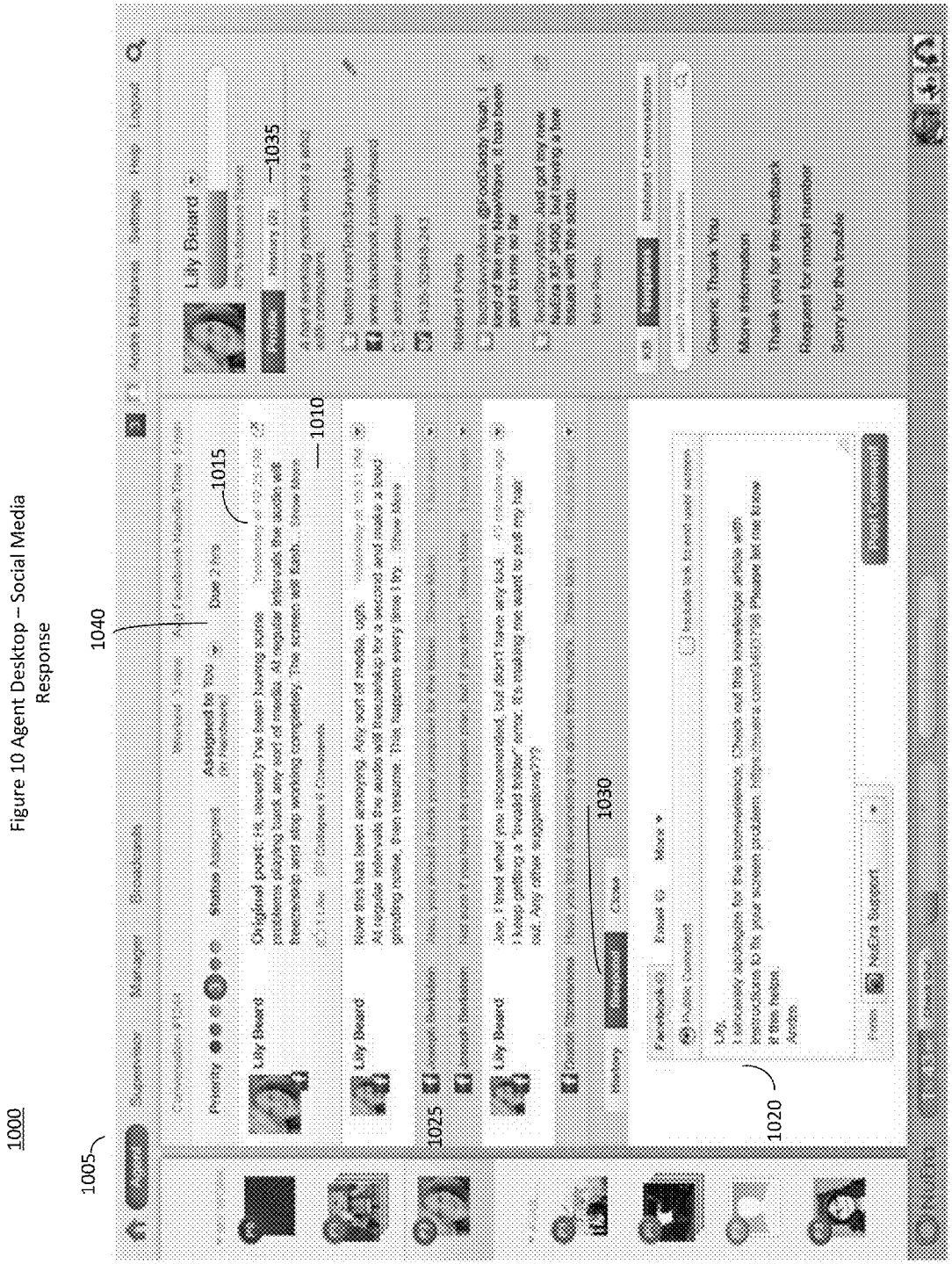
FIG. 10 is an exemplary depiction an agent's desktop showing a communication conduit response display the social customer care system.

FIG. 10 is an exemplary depiction an agent's desktop showing a communication conduit response display of the social customer care system 1000. The agent user interface 1005 displays all conversation threads 1010 so as to have an integrated picture of the customer support request 1015, customer support agent response 1020 and any additional information entered by the customer 1025 along with a response box 1030, history 1035 and open/close status 1040.

Figure 11:
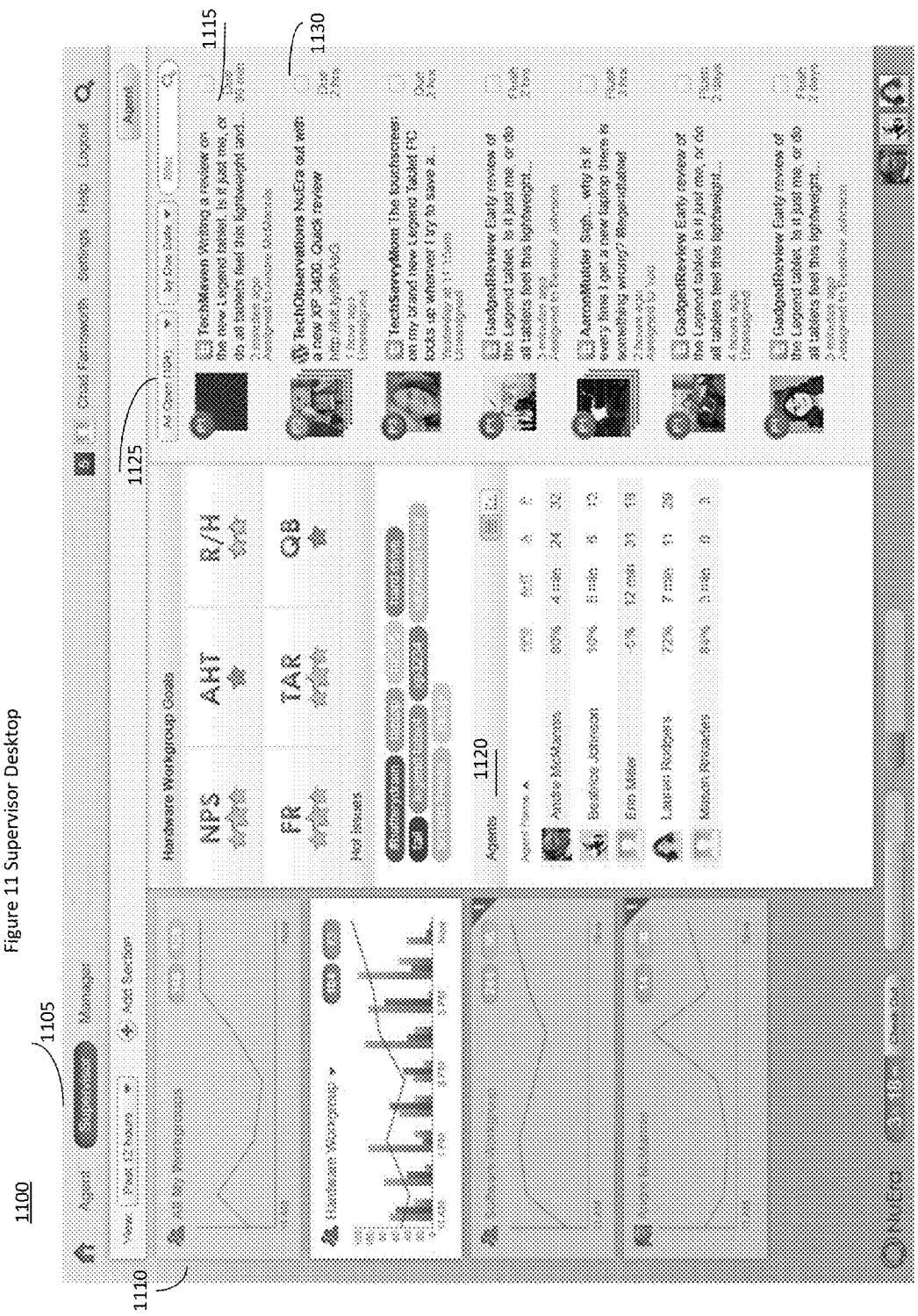
FIG. 11 is an exemplary depiction of a supervisor's desktop of the social customer care system.

FIG. 11 is an exemplary depiction of a supervisor's desktop of the social customer care system 1100. The supervisor desktop 1105 depicts workgroup status, system load 1110 and responses over time 1115, agent activity 1120, request status 1125 and due dates 1130.

Figure 12:
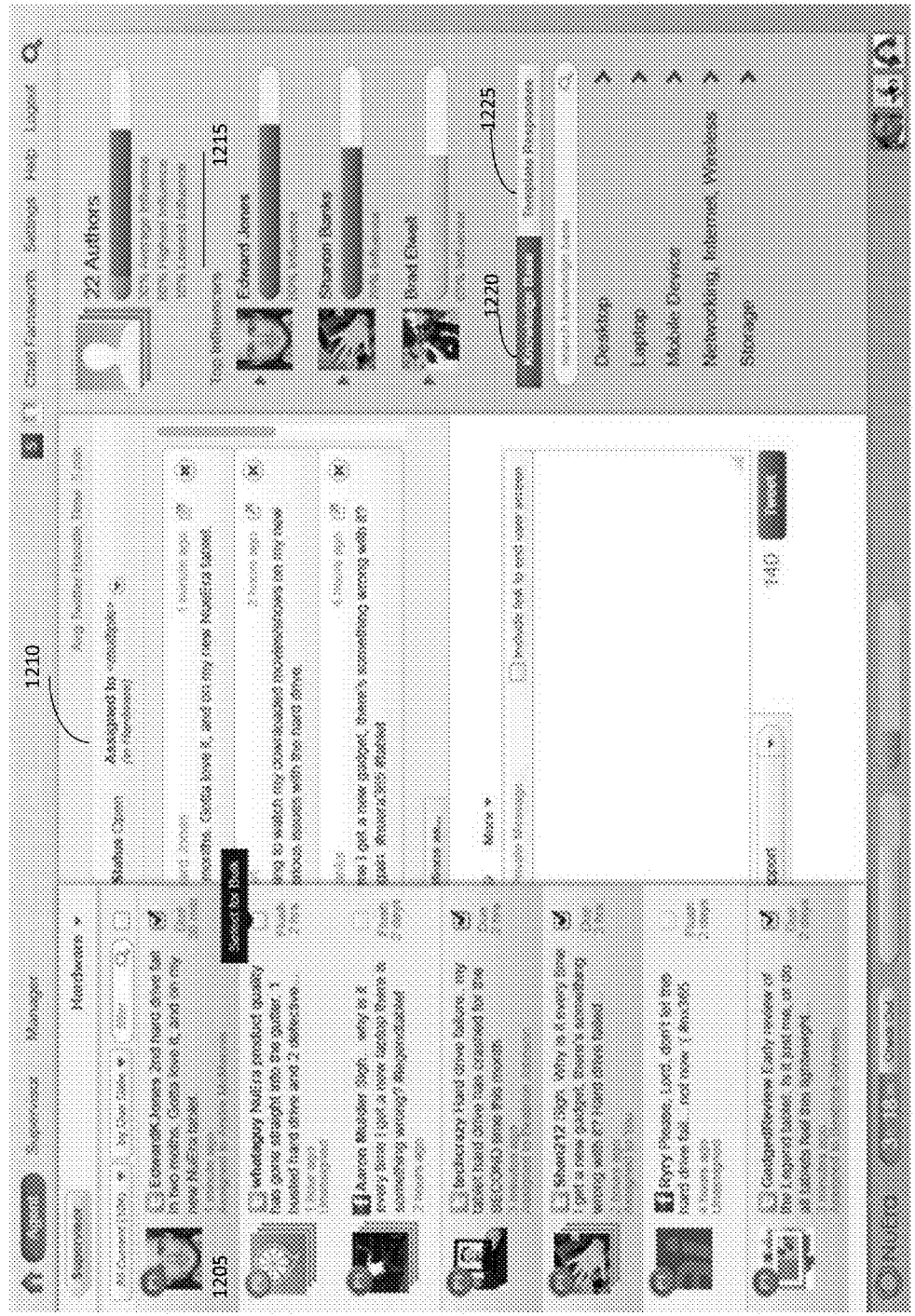
FIG. 12 is an exemplary depiction of a user interface showing one-to-many response of the social customer care system.

FIG. 12 is an exemplary depiction of an agent user interface showing one-to-many response of the social customer care system 1200. It depicts multiple responses and support requests 1205, assignments 1210, top customer influencers 1215 and knowledge bases 1220 and template responses 1225 available to the agent.

Figure 13:
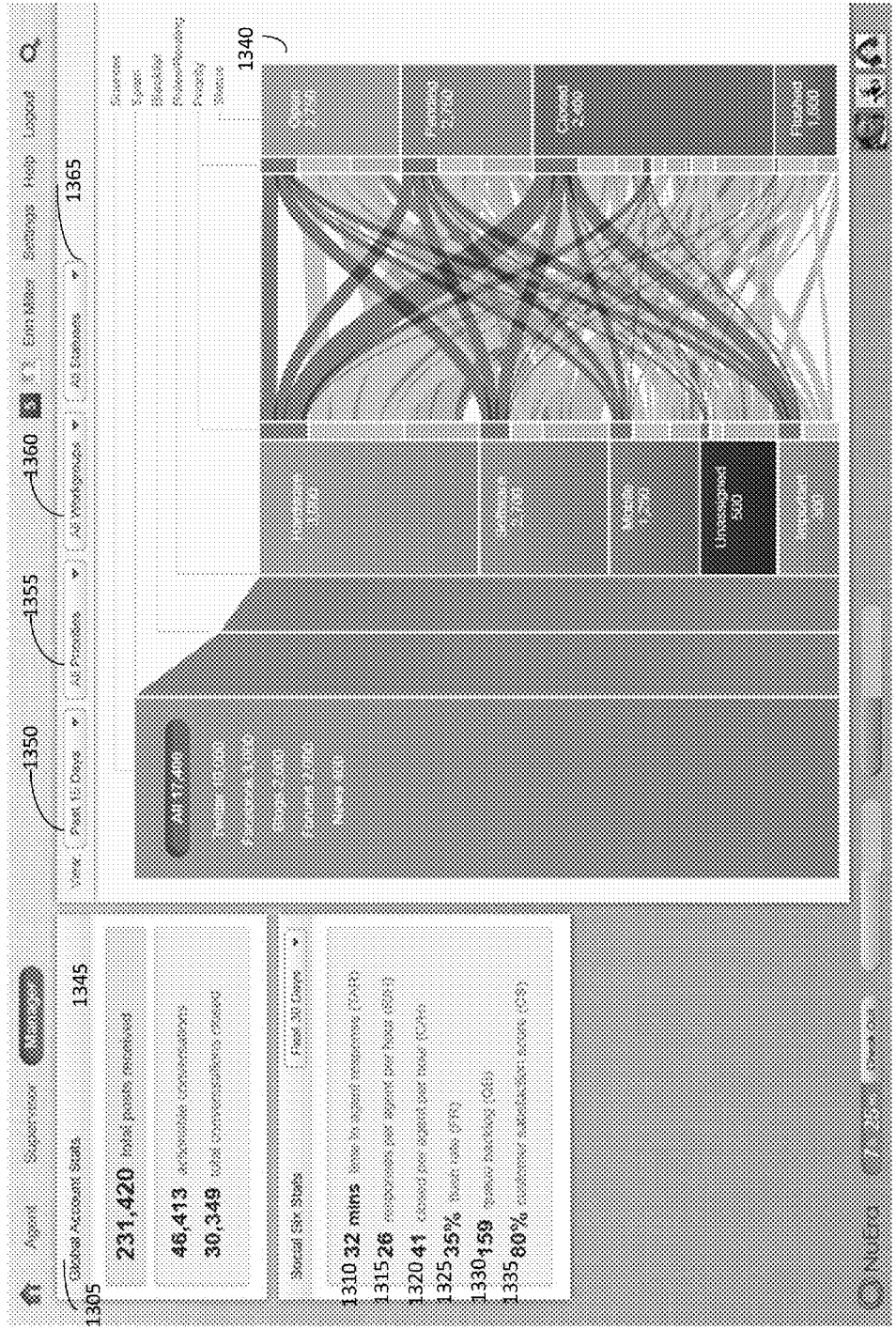
FIG. 13 is an exemplary depiction of a manager's dashboard of the social customer care system.

FIG. 13 is an exemplary depiction of a manager's dashboard of the social customer care system 1300. It gives managers the ability to access support request status data 1305 including time to respond 1310, average agent responses per hour 1315, number of support requests closed per agent per hour 1320, flush rate 1325, queue backlog 1330, customer satisfaction scores 1335, queue backlog and the like. In this example, data can be viewed in graphic 1340 or table form 1345 by date 1350, priority 1355, workgroup 1360 and status 1365.

Figure 14:
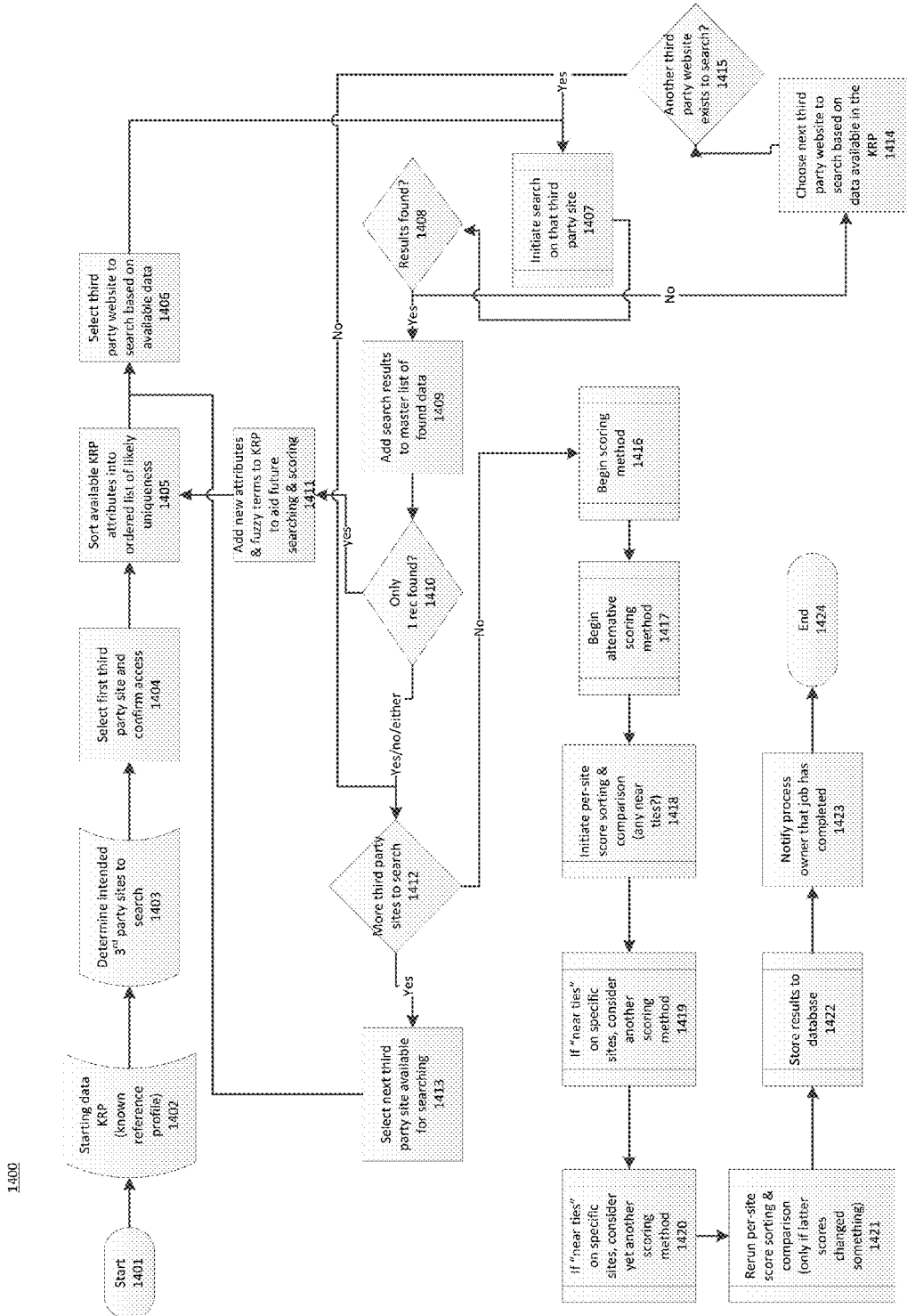
FIG. 14 is a flow diagram of the identity unification processing of the social customer care system.

FIG. 14 is a flow diagram of the identity unification processing of the social customer care system 1400. The following is a glossary of terms for the identity unification function:

Attribute match score: The component of the "total match score" created for a "found user" that occurred due to exact match between specific attributes (e.g. krp.lastName==foundUser.lastName). For example, if the attribute is one of the globally unique ones, this would constitute a "certain hit";

Certain hit: When a "guaranteed" unique value in the KRP (for example, email, phone, Social Security Number, Skype handle) matches a record on a search site, the system associates a certainty percentage that this is the same user, usually 100 percent. Data found from the search site may be added to the KRP to improve searching and scoring on subsequent sites. Certain hits are better and the process can bias "search-site" order to prioritize those searches during the processing.

Community: General term for a social site or online venue where people register and visit. The term community can be used as a "source" (for the KRP) or as a "search site" (to find matching people);

Concept overlap score: This is the component of the "total match score" created for a "found user" that occurs due to abstract concepts (e.g. sports) found in free-form text fields on both profiles;

Found user(s): The data/record representing a user at a "search site" who was found using data from the KRP to conduct a search. Note that these are not necessarily the same person, but the subset of candidates for the comparison & scoring algorithms;

Friend overlap score: The component of the "total match score" created for a "found user" that occurred due to friends with similar names in the respective friend lists;

Fuzzy Match score: The component of the "total match score" created for a "found user" that occurred due to frequency of words found in free-form text fields;

KRP: Known reference profile is the initial data used to start searching other communities. The "known" user-profile whose data is used as the basis for searching other sites to find "identities" which (based on certainty or probability) can be used to join (link or unify) with this "original" person/user;

Minimum match threshold: This the minimum score that a found record must achieve from the initial scoring process to be kept and considered for further scoring processing. After the second scoring process, records below a (per-site) threshold are discarded and only the near-ties (top-scorers) are passed to further scoring processes;

Search site: An online social or community site where people/users with local identities visit and socialize or support one another. This can be an online site such as Facebook, LinkedIn, Twitter, Lithium Communities and the like. The search site could also be a private CRM system but typically, the CRM will provide the "KRP".

Tie, top-scorers or near-ties: When several found user records at a given search site score above some minimum threshold but there is no clear winner (scores are statistically "near" each other), then these records are said to "tie" and more data is needed to determine who (if any) may be the same person as the KRP;

Total match score: This invention uses multiple different techniques to measure similarity, meaning the probability of equal-identity, between user-profiles from disparate communities. After the multiple possible scoring passes, each "profile" results in "total match score" describing its overall likelihood of being the same person as that described by the KRP. The "certain hit" techniques potentially add additional data to the KRP; and (User) profile: A set of fields and values from a "registered-user" record in some online service, community or database (for example, Facebook, Twitter, LinkedIn, other social network sites and the like).

The identity management software function takes data from an existing user profile (called KRP for "known reference profile") from a customer database (for example, CRM) or online social community, and then uses the values found within it to locate similar profiles across other social sites and in a data base management system (if such a system is available), and then runs statistical correlation algorithms to predict which profiles belong to the same "real" (human) person.

For example, if a user's browser is currently viewing a LinkedIn Profile or CRM record of a known customer (the KRP), the user may click a button and the system extracts key values from the page including first, last, hometown, birthdate, employer, college, etc. The identity unification process then uses a few values (first, last, hometown) to search other sites such as Facebook, Twitter, Google Plus for people with similar names. As each list of results comes back, the process extracts values from those profiles as well. A similarity algorithm is run that predicts which profile from each additional site is most likely to be the same person. It stores this information in a central database along with various scoring artifacts. Each time a different client runs the calculation, similar results are scored. There are various types of validation thresholds. The first is a certain hit where a unique value found matches another unique value (such as a user's email address). The second is a high-enough correlation score resulting from initial equivalency type algorithms. The third is enough human reviews of the information to verify the same identity. Finally, if none of the above validation events occur and no human has indicated this is not the same person, then once a threshold of "same matching hits" occurs without the person being connected to someone else, the system assumes it is the same person and no further searching is required.

Turning now to FIG. 14, processing starts 1401. An existing user profile, also called a KRP, of the person to be searched is used as the starting data 1402. The KRP will contain some number of attributes such as those shown in FIG. 22. KRP of the person to be searched for (the search subject) may be retrieved from a customer database in a CRM system or from an online social community. Third party online social media websites to search are determined (for example, Twitter, Facebook, LinkedIn and other social media sites) 1403. At least one third party online website is selected and access is confirmed using authorizations or tokens 1404. The selection of the first online website is to try to find the website that will provide the best information to help identify and verify the person believed to be set forth in the KRP for the search subject. This can mean the website that has the largest set of users or is known to have good search results and data rich user Profiles to add to the KRP. The KRP attributes for search subject that are available are sorted into an ordered list of likely uniqueness 1405. The likelihood of uniqueness may vary by website. The website most likely to yield results is selected to search is based on the now available data 1406 and a search is initiated on that third party website 1407. If results are not found 1408, then the next third party website to search is determined based on the KRP attributes for the search subjects and likelihood that the website will yield results 1414. If another website exists 1415 then processing continues in step 1407. If another website does not exist to search 1415, then continues in step 1412. If results are found 1408, then the search results are added to a master list of found data from third party website 1409 and processing continues in step 1410. If only one record is found or the search results are otherwise lacking 1410, new attributes and fuzzy terms are added to the KRP for the search subject to assist in future searching and scoring 1411 and processing continues in step 1405. Scoring occurs by attribute similar to what is shown in FIG. 22. In any case if there are more third party websites to search 1412, then the next third party website to search is selected 1413 and processing continues in step 1406. If there are no more third party websites to search 1412, then the first scoring method process and algorithms are initiated 1416. Then a second alternative scoring method process and algorithms are initiated 1417. Website scores for the KRP search subject attributes are compared for near ties 1418. If there are near ties, another website scoring methods process and algorithm may be initiated 1419. If there are still near ties, yet another scoring method process and algorithms may be run 1420. Four scoring method processes and algorithms are shown in this FIG. 14, but there is no limit to the number of scoring method processes and algorithms that may be run by the software. If the result of one of these scoring methods changes a score, then per-site scoring and comparison may be run yet again 1421. The results are stored by KRP attributes, generally to a database 1422. The process owner (software and/or human) is notified that processing is complete 1423 and processing ends 1424.

Figure 15:
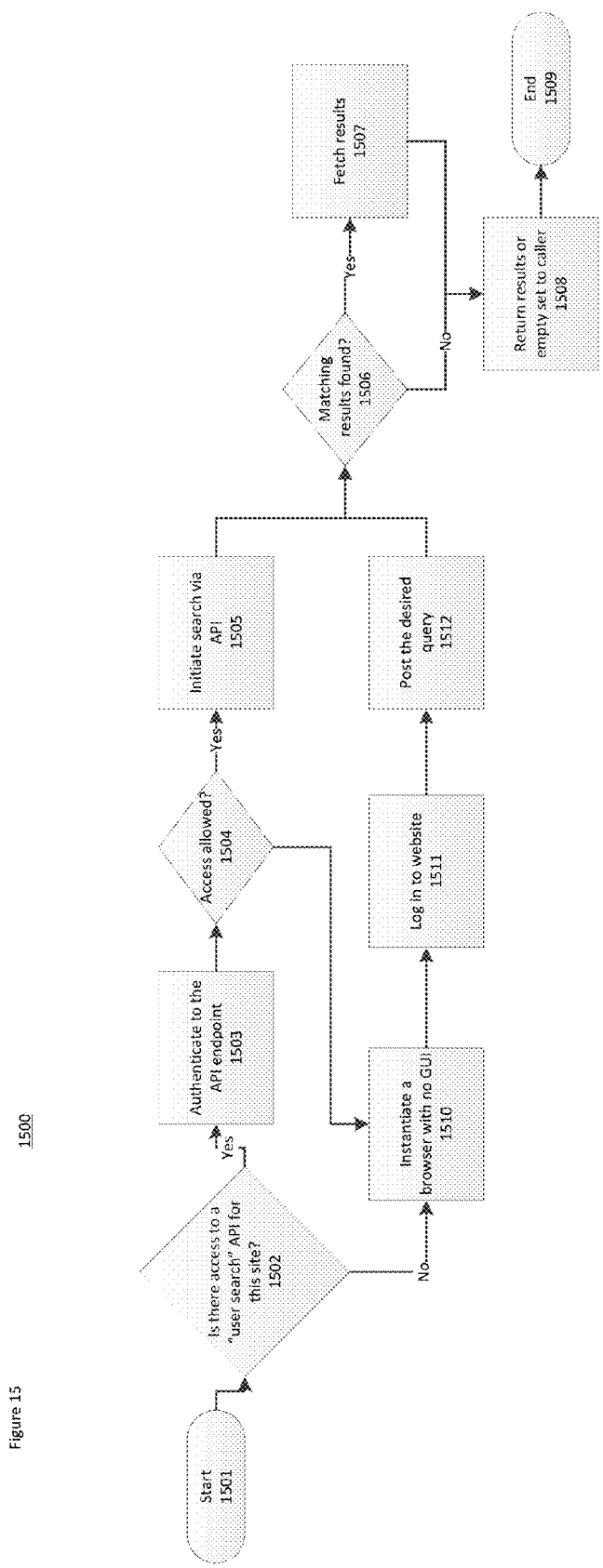
FIG. 15 is a flow diagram of a site searching process of the identity unification processing of the social customer care system.

FIG. 15 is a flow diagram of a site searching process of the identity unification processing of the social customer care system 1500. Processing starts 1501. If there is access to a user search application programming interface (API) for the social media or other website to be searched 1502, then an authentication is made to API endpoint 1503. If access is not allowed 1504, then a "headless browser" (meaning a browser without a graphical user interface (GUI)) is initiated 1510. The software process logs in to or accesses the website (which may be via an http command) 1511 and the desired query is posted 1512 (which may be via an HTTP post) and processing continues in step 1506. If access is allowed 1504, then a search is initiated via the API using the KRP of the search subject and other Profile information 1505 to find a person profile and attributes that come close to or match the KRP for the search subject. If matching results are found 1506, the search results (if any) are retrieved 1507, the return results or if there are no results, then an empty set is returned to the calling software program 1508 and processing ends for this current search site 1509.

Figure 16:
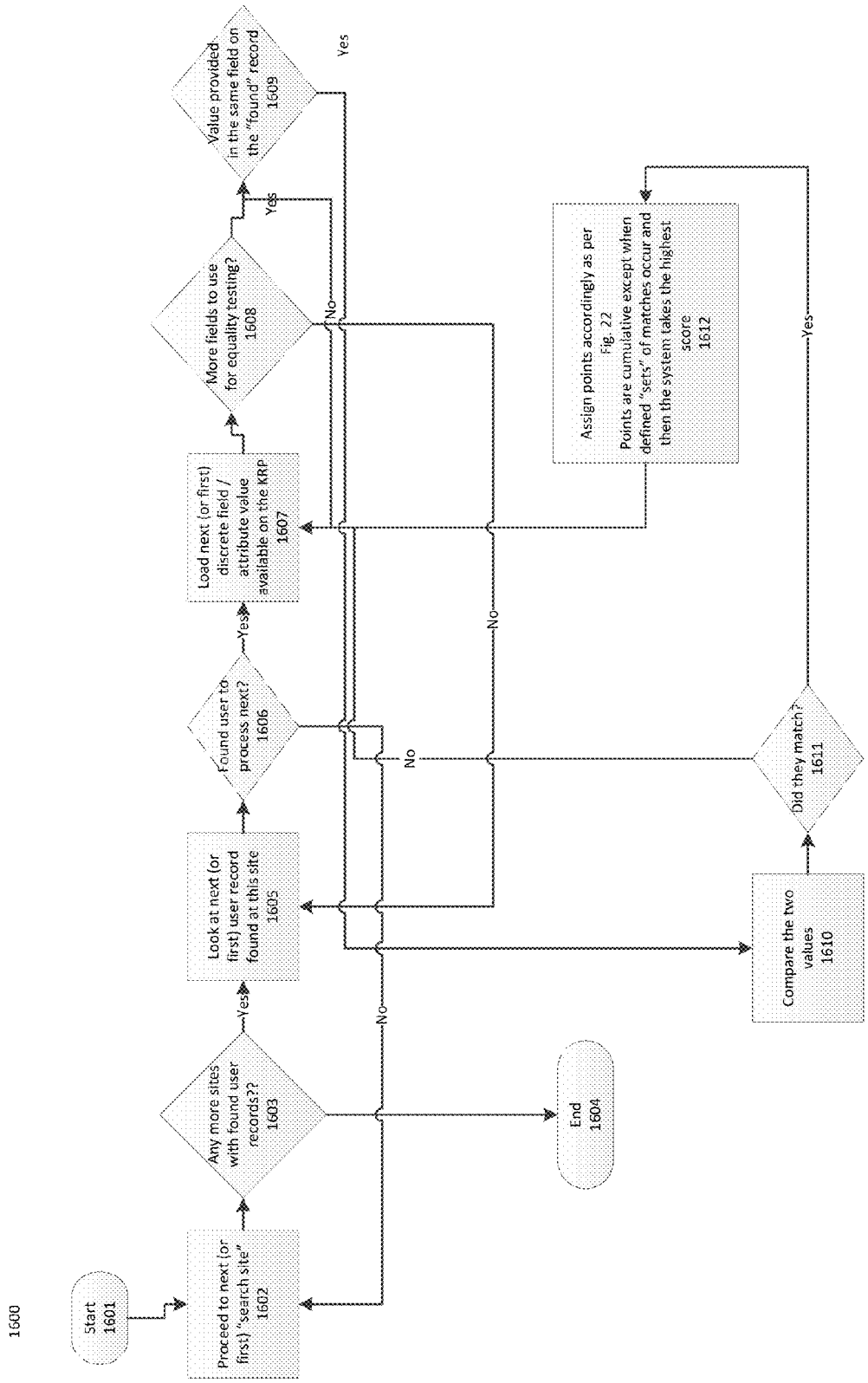
FIG. 16 is a flow diagram of a scoring process of the identity unification processing of the social customer care system.

FIG. 16 is a flow diagram of a scoring process of the identity unification processing of the social customer care system 1600. Processing starts 1601. The process proceeds to a social media site to be searched 1602 and if there are no more sites with found user records 1603 then processing ends 1604. Otherwise if there are any more sites with found user records 1603 that are similar to the KRP for the search subject, a user record is found and examined 1605. If a found user is found 1606, then the discrete fields or attribute values available from the KRP for the search subject is loaded 1607. If there any more fields to use for equality testing 1608 and a value is provided in the same field on the found record 1609, the values are compared 1610 to the KRP attribute for the search subject and if they match 1611 then points are assigned as per FIG. 22 1612. Points are cumulative except when defined sets of matches occur and then the system will normally take the highest score. If a value is not provided in the same field on the found record 1609 then step 1607 is repeated.

Figure 17:
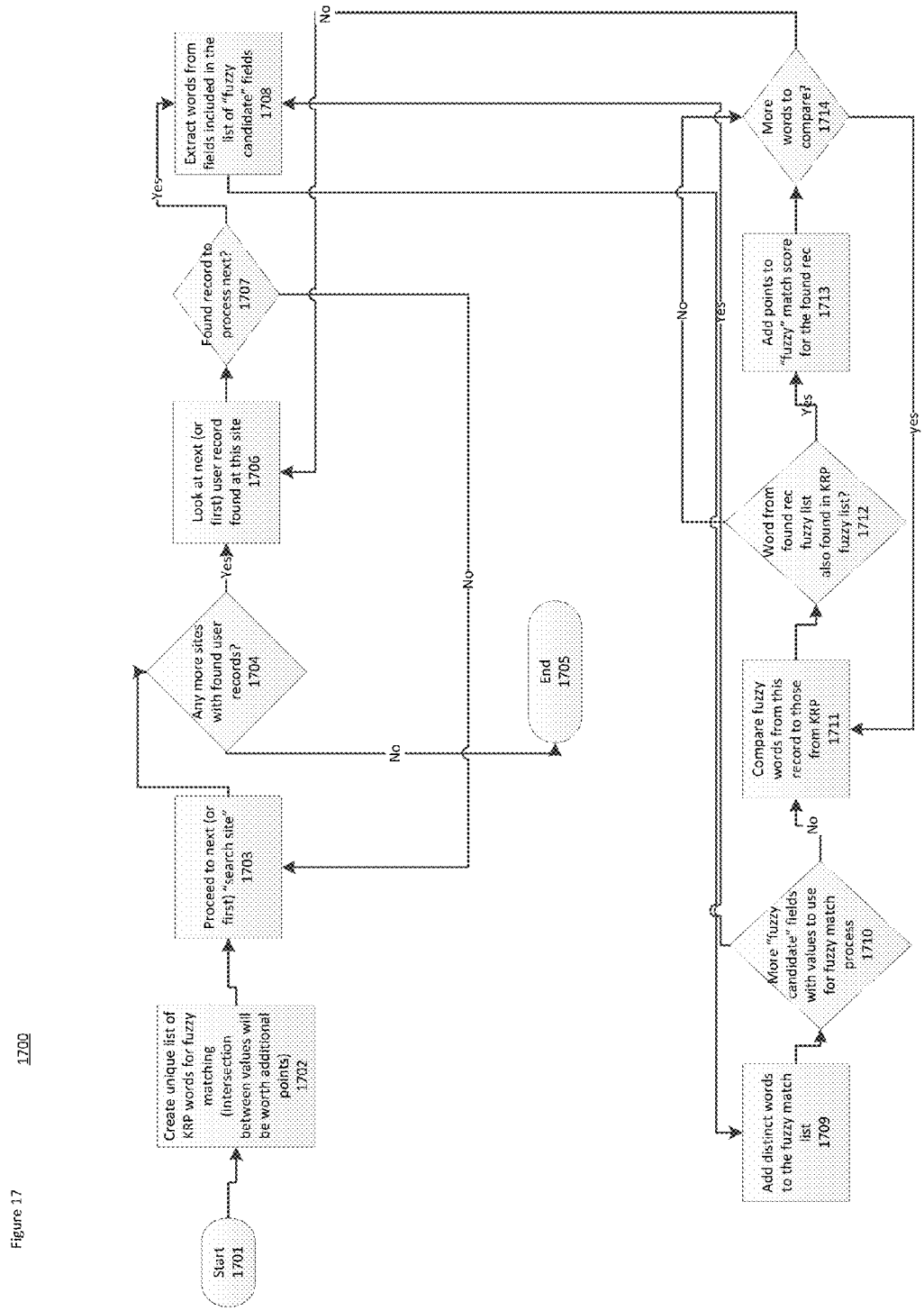
FIG. 17 is a table showing an exemplary score model of a scoring process of the identity unification processing of the social customer care system.

FIG. 17 is a flow diagram of a score compare process of the identity unification processing of the social customer care system 1700. Processing stars 1701. A unique list of KRP words for the search subject for fuzzy matching is created where intersections (closeness) between values are worth additional scoring points 1702. The process proceeds to search a social media website 1603 and if there are no more websites with found user records 1704 then processing ends 1705. Otherwise if there are any more web sites with found user records 1603 that match or are similar to the KRP for the study subject, the user record is found and examined 1706. If there is another record to process 1707, then words are extracted from its fields and included in the list of fuzzy candidate fields 1708 for the KRP. Any distinct words are added to the fuzzy match list 1709. If there are more fuzzy candidate fields with values to use for the fuzzy match process 1710 then the words from this use record are compared to those in the KRP 1711. If a word from a found user record fuzzy list is also found in the KRP fuzzy list 1712, then points are added to a fuzzy match score for the record 1713 by KRP attribute. If there are more words to compare, processing continues for this record. Otherwise the next user record in examined 1706 and processing continues until there are no more sites and no more records to process 1705.

Figure 18:
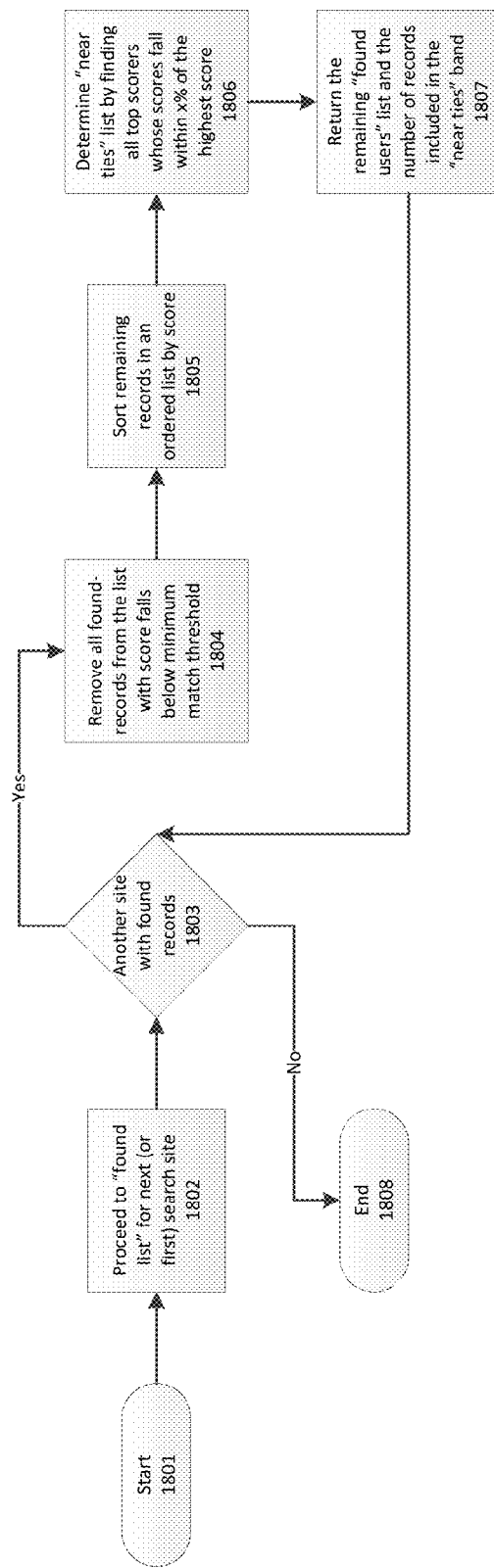
FIG. 18 is a flow diagram of a score compare process of the identity unification processing of the social customer care system.

FIG. 18 is a flow diagram of a score compare process of the identity unification processing of the social customer care system 1800. Processing starts 1801. The process proceeds to search a website 1802 using the KRP for the search subject and if there are no more sites with found user records 1803 then processing ends 1808. Otherwise if another site is found with records 1803 that yield information for the study subject, the information is scored by attribute and all found records from the list with a score that fall below a minimum match threshold are removed 1804. The remaining records are sorted in an ordered list by score 1805. Records that are near ties are determined by finding all tops scores whose scores fall with a certain percentage of the highest score 1806. The remaining found users list and the number of records included in the near tie bands are returned as a result 1807 and processing continues in step 1803.

Figure 19:
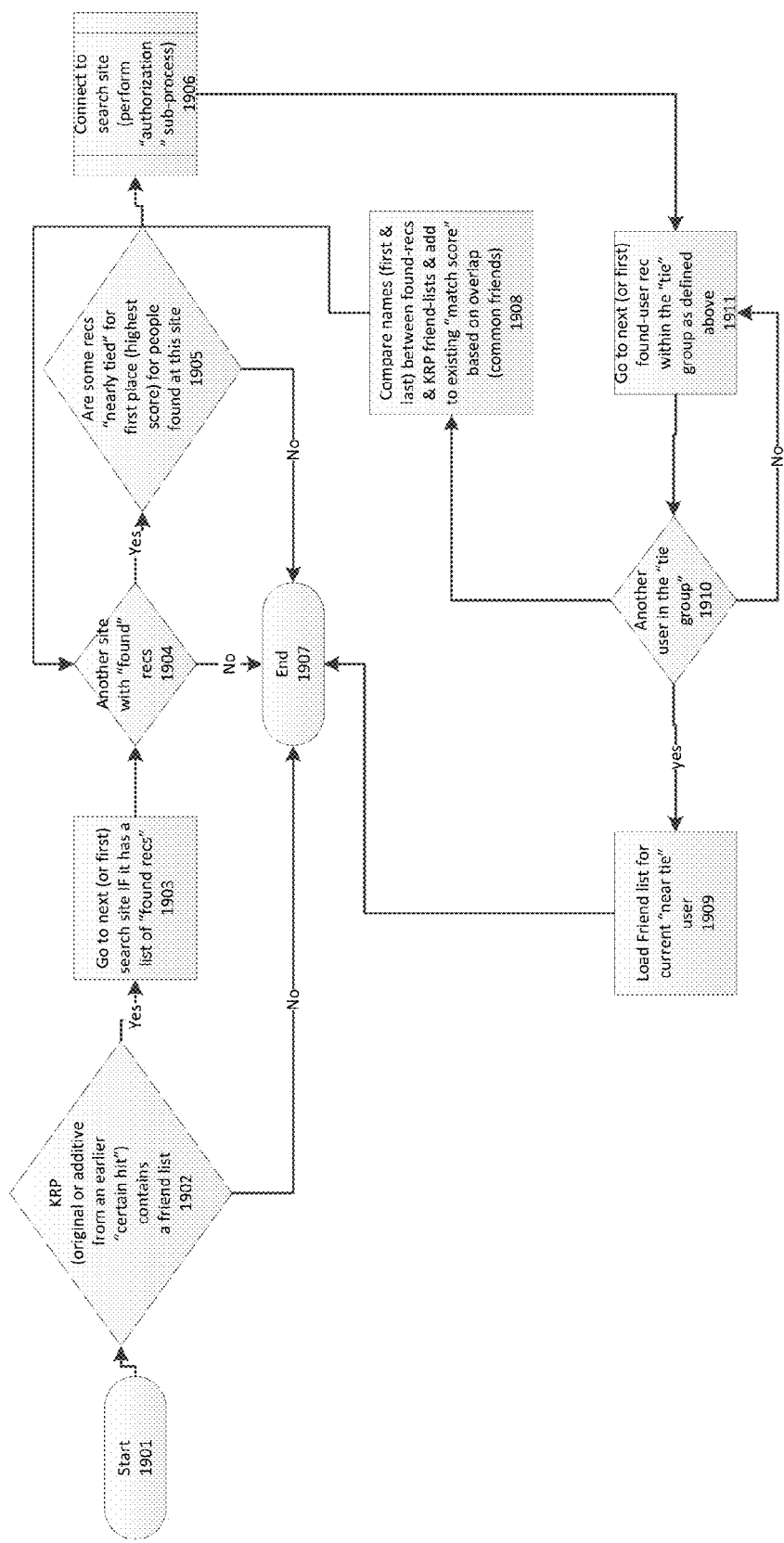
FIG. 19 is a flow diagram of another scoring process of the identity unification processing of the social customer care system.

FIG. 19 is a flow diagram of another scoring process of the identity unification processing of the social customer care system 1900. Processing starts 1901. If the KRP for the search subject which is the original or additive KRP from an earlier hit does not contain a friend list 1902, then processing ends 1907. A friend list is a list of other profiles that are connected to the current customer profile, for example all the people connected to a user of a service such as LinkedIn or Facebook or all the people that the user follows on a service such as Twitter. If the KRP for the search subject which is the original or additive KRP from an earlier hit contains a friend list 1902, then processing goes to a search web site if it has a list of found records 1903. If another site with found records exists 1904, and some records are nearly tied for a highest score for people found at this site 1905. It connects to a search site to perform authorization sub-processing 1906. The next found record within the tie group is found 1911. If there is another user in the tie group 1910, then a friend list of the current near tie user 1909 is loaded and processing ends 1907. If there is not another user in the tie group then processing continues in step 1911.

Figure 20:
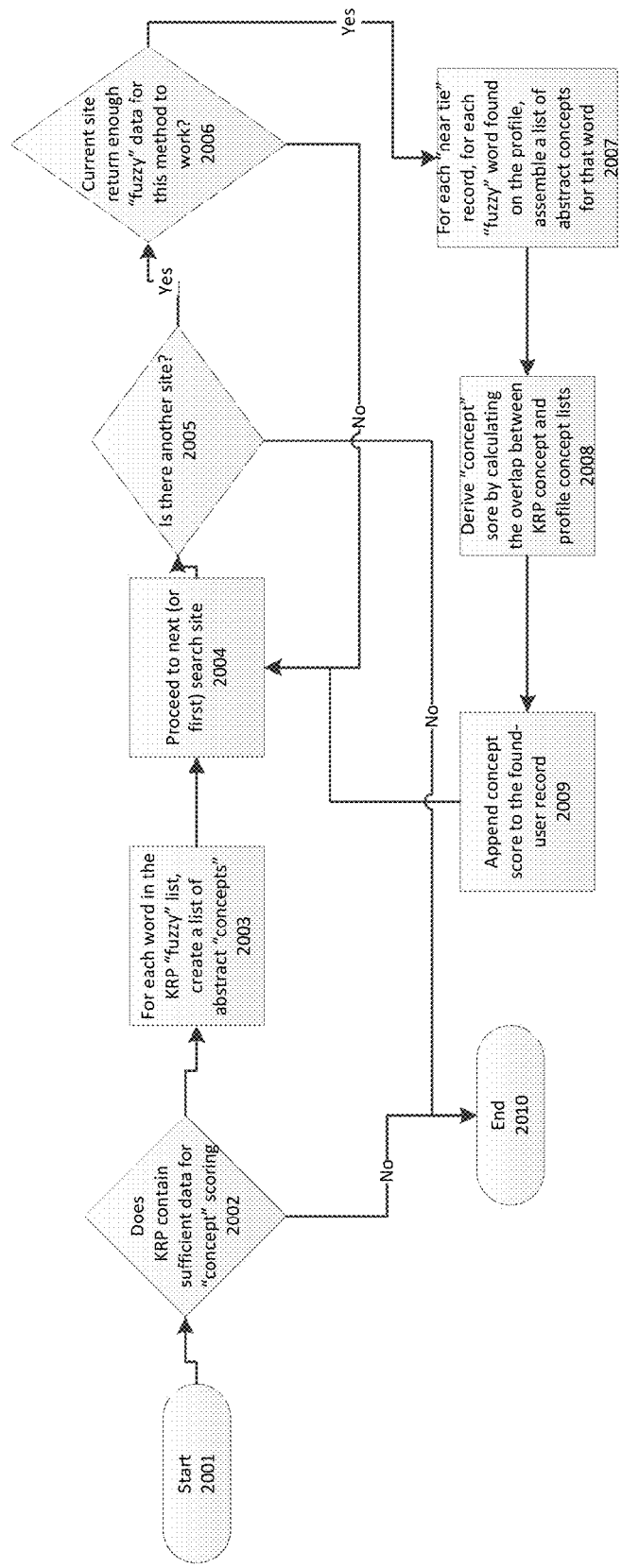
FIG. 20 is a flow diagram of another scoring process of the identity unification processing of the social customer care system.

FIG. 20 is a flow diagram of another scoring process of the identity unification processing of the social customer care system 2000. Processing starts 2001. If the KRP for the search subject contains sufficient data for concept scoring 2002, for each word in the KRP fuzzy list, a list of abstract concepts is created 2003. A KRP contains sufficient data for concept scoring if it contains text fields (e.g. tagline, about-me, favorite-things, caption, status, bio) containing multiple words that can be generalized to more abstract concepts. For example "I love Apple computers and programming" could be synthesized as an affinity for the brand "Apple" and for "technology" in general. If two different profiles express overlapping affinity, it indicates more similarity (that is, it is weighted higher) than profiles that do not. The process proceeds to search a website for the KRP search subject attribute concepts 2004 and if there additional sites 2005 and if the current site returns enough fuzzy data for the concept scoring method to work 2006 for the KRP for the search subject then for each near tie record, each fuzzy word found on the profile a list of abstract concepts for that word are assembled 2007. A concept score is derived by calculating the overlap between the KRP abstract concept created in step 2003 and a profile concept list 2008. If are no more sites to search 2004 or the KRP does not contain sufficient data for concept scoring 2002, then processing ends 2010.

Figure 21:
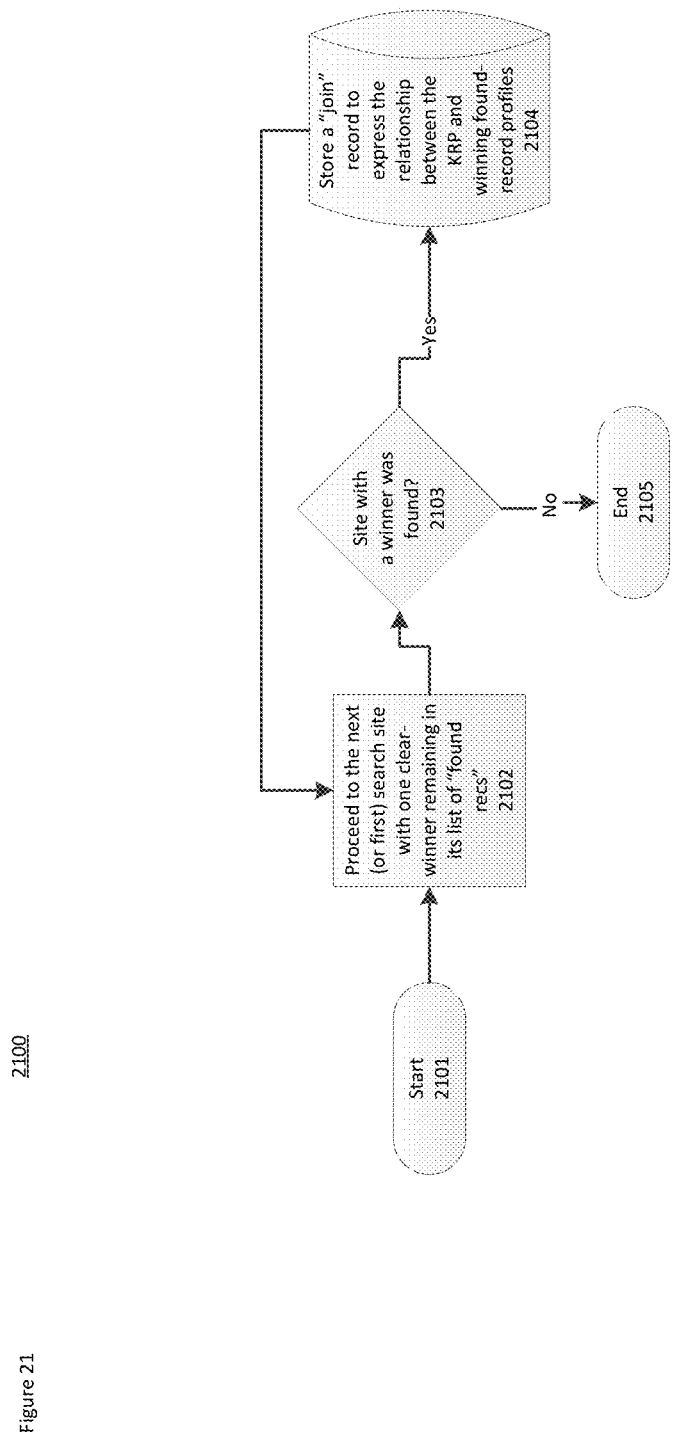
FIG. 21 is a flow diagram of a results storing process of the identity unification processing of the social customer care system.

FIG. 21 is a flow diagram of a results storing process of the identity unification processing of the social customer care system 2100. After the scoring process depicted in FIGS. 17 through 20, and if there is one clear winner remaining in the list of found records 2102 and if a winner was found 2103 then a join record is stored to express the relationship between the KRP and winning found-record profiles 2104. If no site winner was found processing ends 2105.

FIG. 22 is a table showing an exemplary score model of a scoring process of the identity unification processing of the social customer care system 2200. As an example, scoring model points may be assigned points as per the table. Points are cumulative except when defined "sets" of matches occur and then the system takes the highest score.

Figure 23:
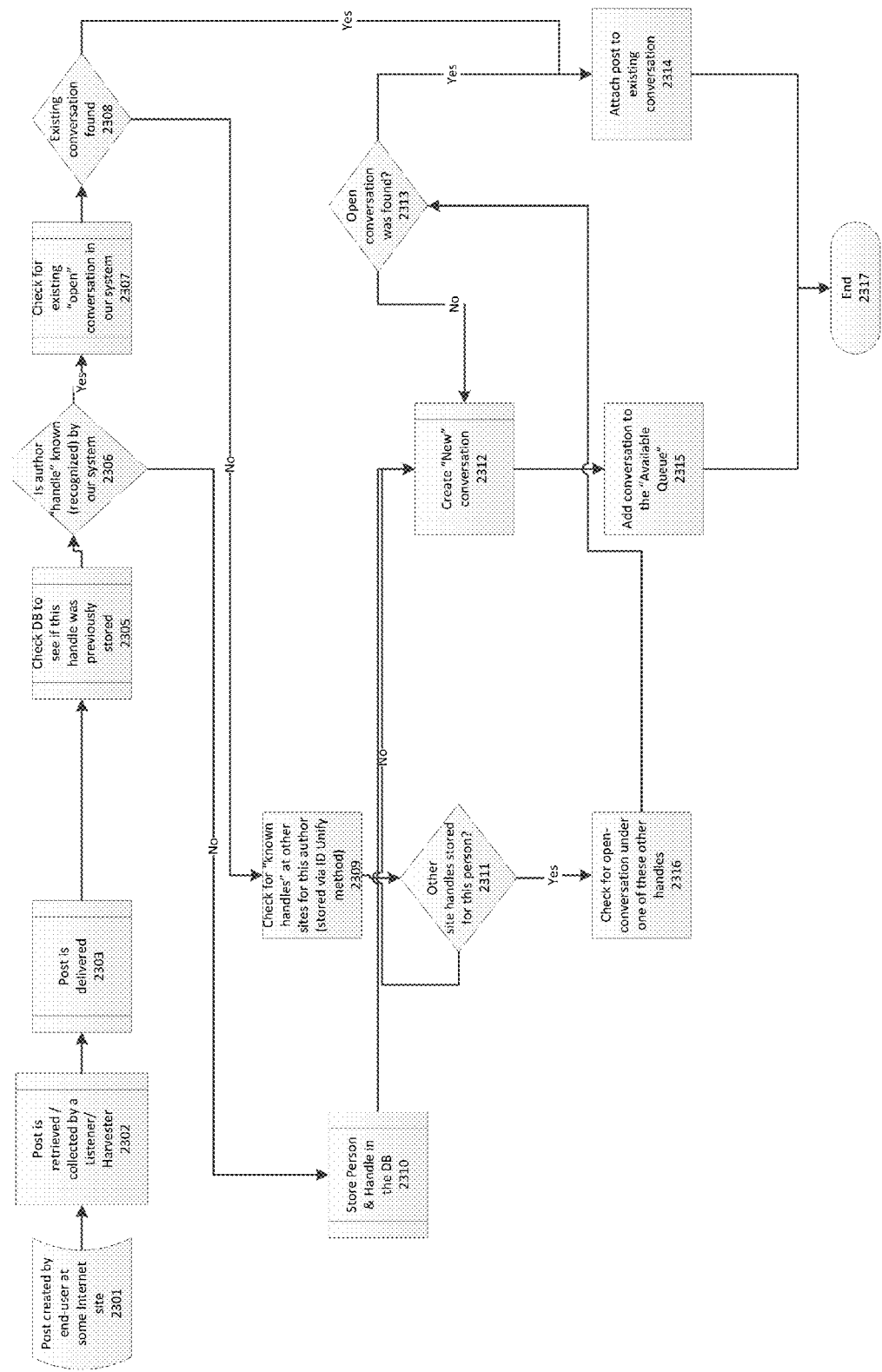
FIG. 23 is a flow diagram of a conversation consolidation and management processing of the social customer care system.

FIG. 23 is a flow diagram of a conversation consolidation and management processing of the social customer care system 2300. Conversation consolidation, threading and management (CCM) involves detecting with a high probability that different messages from similar or varied sources or user names used by a person (search subject) on the web are all from the same individual. Unifying the set messages into one cohesive (threaded) "conversation", allows a business and its customer service organization to see a complete picture of the issues and emotional state of their customer. Public opinions on the Internet about a company's product, brand service by high-influence individuals can impact reputation and sales. Companies want to insure proper issue "closure" for company's customer service interaction with a customer and show that the customer is satisfied. In addition, if the company can show public visibility to all hard-earned customer "satisfaction", it's important that parts of each support/service conversation be visible and chronologically ordered for the support agent handling the issue. If escalation is required, this entire interaction can then be transferred as a cohesive unit to the next agent.

While private conversations in email, chat or social media are typically bi-directional (aka "threaded"), the technologies used for public messages (such as Twitter & Blog postings) often exist standalone (in a context-free representation). This means that each expression/utterance by a customer on that social media site is a separate data item and while it may be displayed in date-time order, it is not treated as a discrete-united set of records belonging to that customer. Even in cases where posts and responses are threaded and such relatedness-data is preserved by the originating site, this "relatedness" information is not typically preserved by listeners and web scrapers which harvest the data for tools such as ours. As such, it's frequently hard to tell which unique posts in aggregate constitute a single conversation. To make matters worse, support conversations with customer service representatives can switch social media sites, from Twitter to a branded-community or company website as an example, and with multiple sources/venues, there is no single "originating" source to supply the relatedness information.

There are at least four primary processes to capture and display relatedness between disparate social website posts (also known as records) to show that there is one "conversation" thread that belongs to a customer (search subject):

Customer (Author-handle) & source-website identification intersected with an existing open conversation. When a posting on a social media or other website comes from a previously known search subject (author-handle) that has been posted on the same social media website or service (for example Twitter) and is during a time frame in which a customer service representative for a company is interacting (has an open conversation) with a customer, then a probability analysis is run to determine if the posting can be added to the information the company has collected during this interaction.

Manual agent identification entered via the agent (customer service representative) user interface. If a post has been linked with a customer but the post is unrelated to the ongoing conversation or not from the customer, a user interface control (widget) allows an agent or supervisor to manually detach the post and start new conversation with the unrelated post. This same set of user interface controls allows the agent to merge two separate conversations together.

Cross-venue via identity unification. This is the processing describe in FIGS. 14 through 22 for identifying and unifying information for a search subject.

Same-parent thread identification provided by originating service. Certain data-feeds are robust enough such that each post contains a record-id which points to its parent (the "thread-id"). If such data received and a parent record (KRP for a search subject) exists, the system merges the new record to the existing thread.

Turning now to FIG. 23 2300, if a post is created by a customer (search subject) at an Internet site 2301, the post is retrieved and collected a listener/harvester 2302. The post is delivered to the present system 2303. A database is checked to see if the "handle" for this customer is previously stored in or accessible to the present system (for example in a CRM database) 2305. If the customer handle is recognized by the present system 2306, that is, the customer matches a search subject's data stored in or accessible to the present system, then the system checks for existing open conversations (meaning interactions) with this customer 2307. If the handle is not recognized by the present system 2306, then the search subject's information and handle data is stored 2310 and processing continues in step 2312. If an existing conversation is found 2308, then the information is added to the existing conversation data 2314 and processing ends 2317. If not, then checks are made for known handles for this search subject at other websites and the processing for identity unification described in FIGS. 14 through 22 occurs 2309. If other handles are stored for this search subject 2311, then a check is made for open interactions (conversations) under one of these other handles 2316. If a conversation is found then processing continues in step 2313. Otherwise, a new interaction (conversation) is created 2312. The conversation is added to an available queue 2315 and processing ends 2317.

Figure 24:
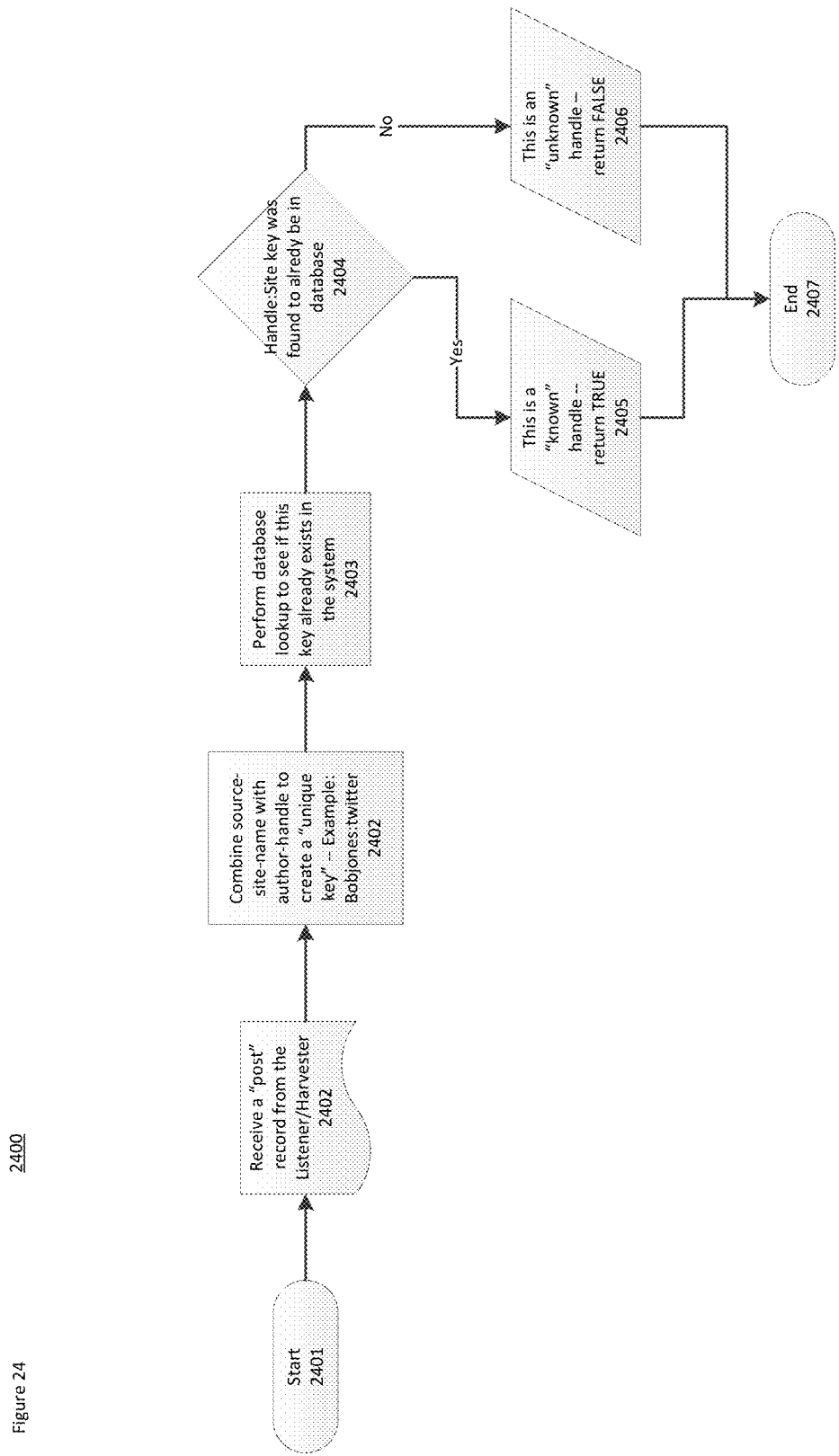
FIG. 24 is a flow diagram of a handler checking process of conversation consolidation and management processing of the social customer care system.

FIG. 24 is a flow diagram of a handler checking process of conversation consolidation and management processing of the social customer care system 2400. Processing starts 2401. The system receives a post (also known as a message) from a listener/harvester 2402 from a source information site. The source site and post with the handle (third party's web name which is the third party's social-site profile) is combined with the author handle to create a unique key (for example Bob-jones:twitter) 2402. The system performs a database lookup to determine if the key already exists in the present system's database 2403. If the key is found to already exist in the database 2402 then the handle becomes marked as known and true 2405. If the key does not exist in the present system's database 2404, then the handle is marked as unknown and false. Processing ends 2407.

Figure 25:
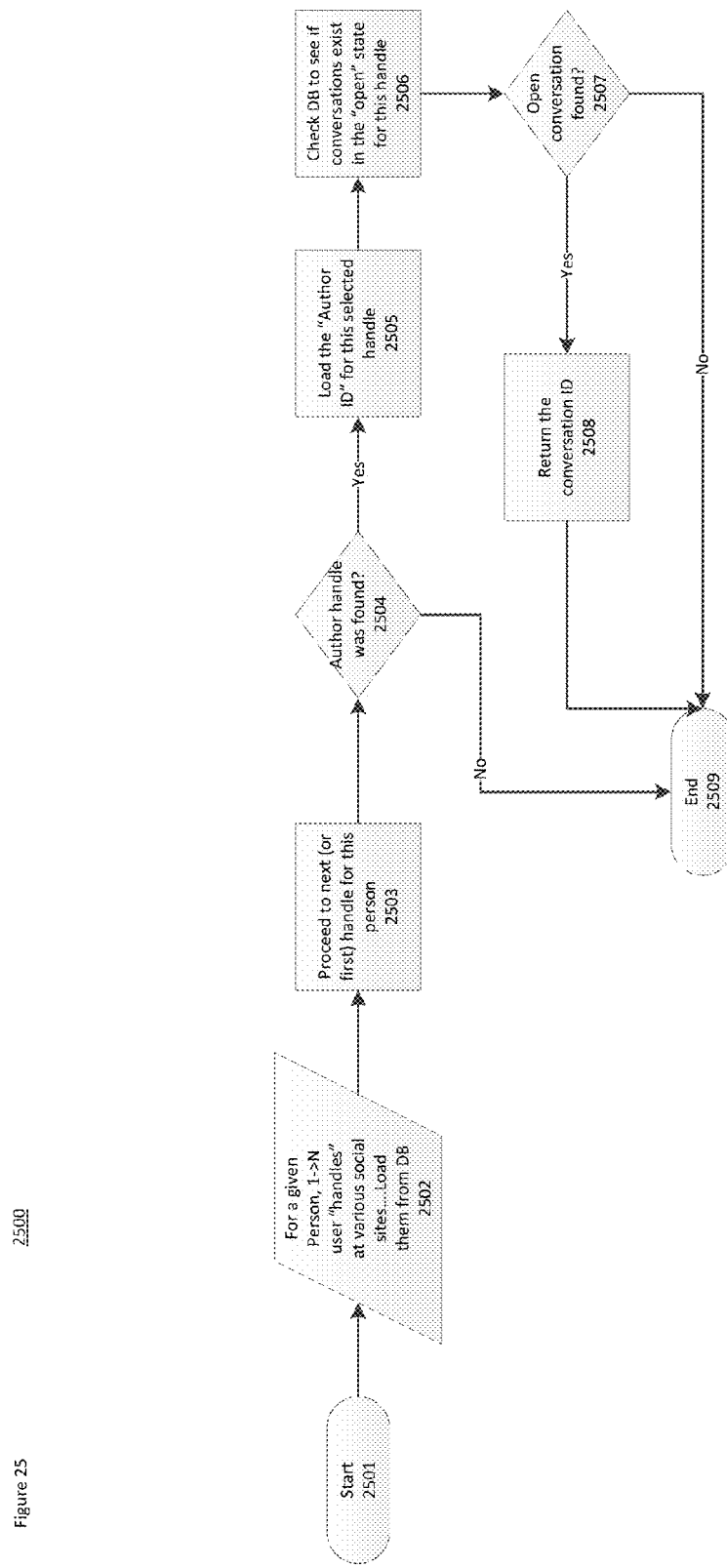
FIG. 25 is a flow diagram of a an open conversation check process of the conversation consolidation and management processing of the social customer care system.

FIG. 25 is a flow diagram of an open conversation check process of the conversation consolidation and management processing of the social customer care system 2500. Processing starts 2501. For a given customer (search subject), some number of handles that may have been previously retrieved from social media sites are retrieved from a database 2502. For a search subject, if a handle for the search subject 2503 is found 2504 then, an author identification for this handle is loaded 2505. A database is checked to determine if conversations (interaction) exist for this handle 2506 and if they do, the conversation identification is returned 2508 and processing ends 2509. If the author handle is not found 2504 processing ends 2509.

Figure 26:
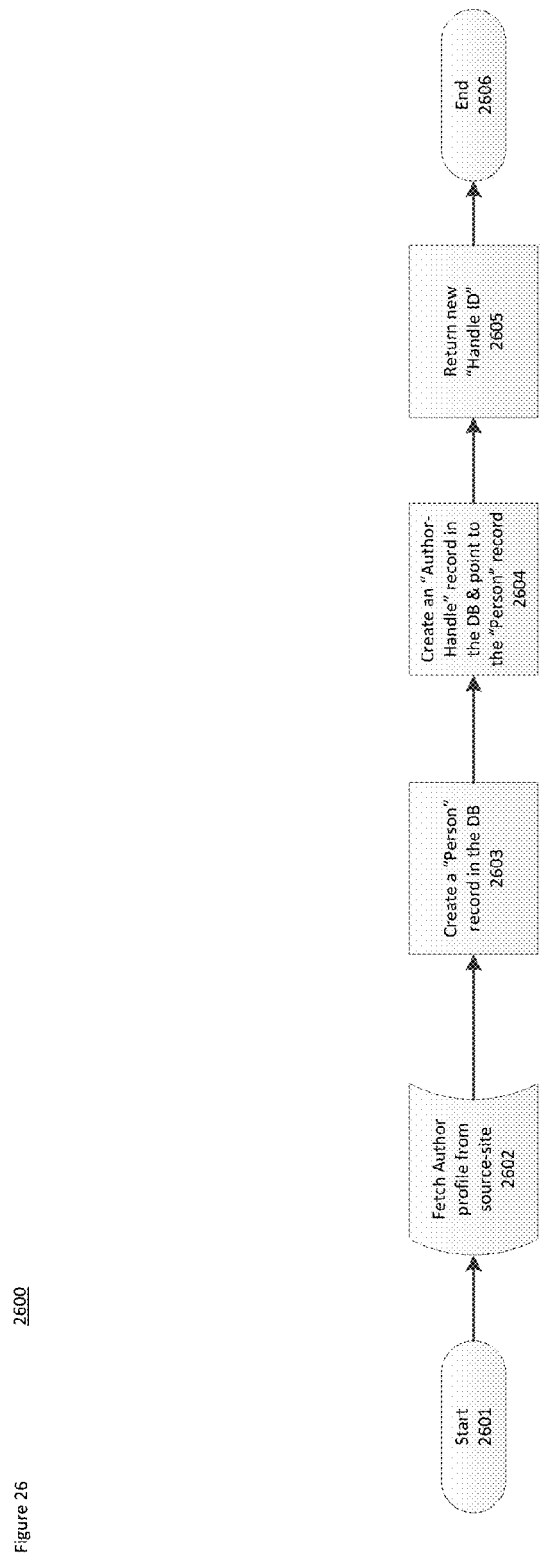
FIG. 26 is a flow diagram of a handler process of conversation consolidation and management processing of the social customer care system.

FIG. 26 is a flow diagram of a handler process of conversation consolidation and management processing of the social customer care system 2600. Processing starts 2601. A profile for the current search subject is retrieved from a source website 2602. A record of this profile is created in a data base 2603. A handle record is created and linked to the search subject record for the person 2604. The new handle is returned to the overall process 2605 and processing ends 2606.

Figure 27:
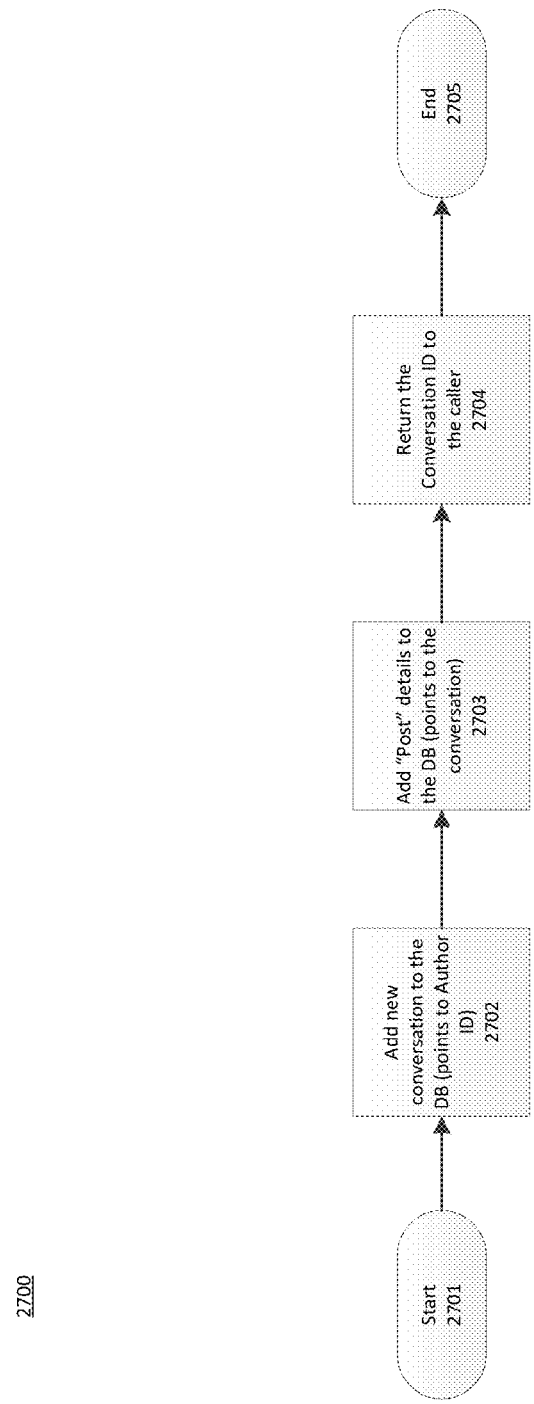
FIG. 27 is a flow diagram of known handler process of conversation consolidation and management processing of the social customer care system.

FIG. 27 is a flow diagram of known handler process of conversation consolidation and management processing of the social customer care system 2700. Processing starts 2701. Any new interaction (conversation) with a customer (search subject) is added to the database and linked with that customer's identification 2702. Post details for the interaction are added to the customer's identification 2703. A conversation identification is returned to the overall process of conversation consolidation and management 2704 and processing ends 2705.

Figure 28:
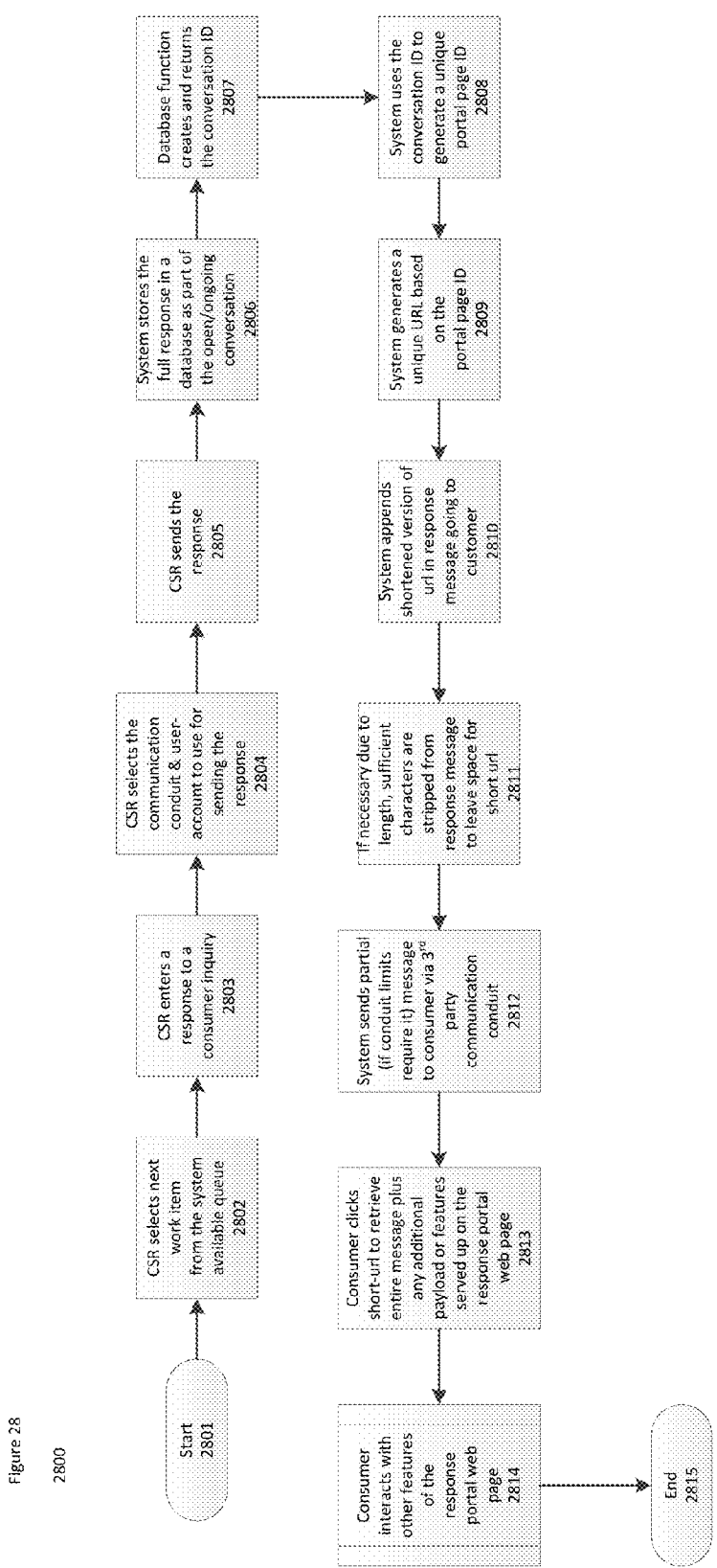
FIG. 28 is a flow diagram of the response portal processing of the social customer care system.

FIG. 28 is a flow diagram of the response portal processing of the social customer care system 2800. Prior to the response portal webpage processing of the current system, it has been difficult for businesses to assess and track customer satisfaction measures, surveys, comments and usage patterns for customers, across communication channels that are outside of a company controlled infrastructure. So communications with customers prospects or other parties that are happening via Internet social networks and other electronic social interactions have not been adequately tracked to provide important information, about individuals or in the aggregate, about customer satisfaction, responses to questionnaires, comments and other usage patterns that can help a business gauge customer sentiment about a business and its products and services. As used herein, customer may be an actual customer of the business, a prospect or just a user.

Modern automatic call distribution systems provide customers with the opportunity to complete a questionnaire relating to a specific interaction between the customer and a business. This could, for example, be to report a good or bad service experience or additional related issues at the end of each call. In contrast, when consumers receive a support question response from a company via the web, there is no built-in, homogenous way for them to provide a "satisfaction rank" or otherwise report on or about the service they have received. Even worse, if they are especially unhappy, they may criticize the company in a public forum. The present system provides a response portal webpage and associated processing for quality measurement and to collect customer data that may lead to improvements in business results or the service process itself, as well as to give the customer a managed and moderated outlet for expression.

Each time the present system sends a response to a customer, it includes a shortened url link (with embedded transaction identifier) pointing back to the response portal webpage where the customer can see more details about the answer, view knowledge-based articles, see related posts and responses, and get answers to basic questions about the solution provided and other information or the customer service representative ("CSR") that provided the information. As used here, the term knowledge-based articles includes all forms of peer-to-peer and organizational knowledge produced or aggregated and relating to the topics or issues. Discussion items (parts of the conversation) that occurred via non-public channels (meaning private) are hidden on the response portal webpage until the person viewing the page authenticates their identity via credentials from the originating site or service. This preserves privacy while allowing the public content to be reused by others to resolve similar issues.

The system accepts consumer feedback entered via the response portal and uses such feedback as a mechanism to automatically alter the value and relevancy weight of specific knowledge-based articles. If several consumers indicate that a specific article or document is helpful in resolving a certain issue, then that article is ranked as such and will be more likely to be presented to agents, experts or individuals reviewing a customer request, and thereby is more likely to be attached at the top of subsequent responses for similar problems. Each time an issue resolution dialog goes back and forth between a consumer and a CSR, valuable corporate knowledge is created that could be reused for other customers with the same problem. The present system tags (categorizes) these conversation threads and stores them in a publically accessible knowledge-based repository of documents so other consumers can find and employ the solution to an issue they may have. CSRs may also access this knowledge-based repository of documents to solve a consumer issue. The system also captures customer feedback such as a quality assessment on the support received. It tracks this and other information collected across multiple social conduits/channels. This allows the system to automatically promote one solution over others as a "best-fit" for subsequent searches, improving the efficacy and acceptance by customers of solutions provided via social channels.

The present system using the response portal allows large documents (for example that may exceed social media such as Twitter or Facebook message size limitations) to be viewed and downloaded. The present system creates a centralized public & agent-moderated knowledge-base of common answers and questions and other information, allows for promotional and coupon delivery to aid in product and service upselling, provides for tracking to aggregate knowledge article and solution usage across multiple social channels and provides for using "prompted" hashtags to simulate survey completion as well as adjusting these survey results statistically via clustering language patterns to compensate for "missing" hashtags. As used herein, hashtags means a word or phrase prefixed with the symbol #, thereby allowing any term to be searchable in a social media context. Hashtags can be useful because some consumers will not visit or utilize the response portal webpage to comment on or provide a rating for their recent service experience. To continue to gather meaningful stats for continuous improvement, the present system provides a limited list of "prompted hash-tags" that allows consumers to give similar feedback using a social media system such as Twitter. The hashtag list may be published on a social media site such as on a Twitter profile page for the company and may be included at the end of support tweets. The present systems then culls all posts or status updates (also known as tweets) with the same included hashtags and uses the consumer's author-handle as part of the identification unification function to correlate the feedback to specific support tickets, as well as track total performance metrics. A certain percent of consumers will ignore the "prompted hash-tag" response option, but still provide useful feedback in the raw-text of subsequent tweets. The present invention uses language clustering patterns to infer that the language detected within such follow-up tweets, does in fact fall within the satisfaction range found commonly in Tweets using "prompted-tag xyz" and uses statistics to adjust aggregate metrics to compensate for the "missing" hashtag in the overall satisfaction scores. For example, a CSR sends answers to users A, B and C answers. User A follows the short-url to the response portal webpage, reads the response and completes a survey stating the CSR gave a good answer or otherwise rated the service as good or better. This is one data point to assess the particular CSR's performance. User B does not go to the response portal webpage but instead replies to the CSR's answer tweet and includes hashtag #acmesup+3 which is the most positive indicator (#acmesup+1= fair, #acmesup+2=good, 3=GREAT). Now there are two data points to assess the CSR's performance. User C doesn't do either of the above but instead tweets that the CSR's service was great. The language clustering function of the present system equates User C's tweet with the response being great or good. Now there are three data points to assess CSR competence despite the fact that each data point was acquired through a different technique.

Turning now to FIG. 28, the response portal webpage processing starts 2801. A CSR selects the next work item which is usually in the form of a question or request from the system available work queue 2802. The CSR enters a response to a consumer query 2801. The CSR selects the communication conduit or channel to be used for the communication which is typically the same conduit or channel the consumer used and the user-account that the CSR will use to send the response 2804 and sends the response 2805. The present social customer care system and the response portal application store the full response in a database as part of the open and ongoing conversation with this consumer 2806. A database function creates and returns a conversation identifier 2807. The response portal application used the conversation identifier to generate a unique portal page identifier 2808. The application generates a unique URL based on the portal page ID 2809. The system appends a shortened version of url in the response message going to customer 2810. If necessary due to length, sufficient characters are stripped from response message to leave space for short url 2811. The system sends the message or partial message (if conduit/channel limits require it) to the consumer via a third party communication conduit/channel 2812. Proprietary messaging systems (for example, social media services such as Twitter, Facebook, blogs, communities and the like) have unique and varied restrictions on message and attachment characteristics. For example, at the present time Twitter restricts messages to 140 characters and Facebook does not allow attachment of certain types of external files.

To send a private message, Twitter also requires that the intended recipient be "following" the sender (meaning that the recipient has chosen the sender as a friend). These policies burden service and support organizations trying to deliver full and detailed resolution steps to their customers and get accurate feedback for issue closure. The present system automatically tracks the message delivery limits of the underlying delivery conduit, and attaches all undeliverable message artifacts to the destination response portal webpage which may be the webpage and website accessible by the short-url in included the consumer response.

The consumer clicks the short-url to access the response portal webpage and retrieve the entire message plus any additional payload or features present on the response portal web page 2813. The consumer is also allowed to interact with other features of the response portal webpage including but not limited to searching the knowledge-bases for additional information and coupons and upselling information 2814.

Turning now to FIG. 29, which shows a table showing customer options while interacting with the response portal webpage of the social customer care system 2900. The customer option 2091 may include, but is not limited to, the following actions: seeing the entire conversation thread (excluding private messages) 2902; authenticating to the source (communication conduit) site, in order to see private messages 2903, answering a survey or other questionnaire 2904; claiming and consuming a coupon or special offer 2905; downloading and reading a knowledge-based article or other attachment provided by the CSR 2906; responding back to the CSR as the next step in the discussion 2907, searching the provided knowledge-base for other articles or related solutions 2908 or requesting community (known as swarming) support in answering or weighing in with opinions or suggestions on the problem 2909.

Although the present invention has been described in detail with reference to certain preferred embodiments, it should be apparent that modifications and adaptations to those embodiments might occur to persons skilled in the art without departing from the spirit and scope of the present invention.

The invention claimed is:

1. A computer-implemented method for automatically assessing and tracking user satisfaction, comments and activity patterns across Internet based social networks, the method implemented by computer-executable instructions being executed by a computer processor comprising the steps of:
   inputting into memory a user query, the query including a request from the user and a user Internet account;
   selecting a communication channel and the user Internet account and sending a response to the user query;
   storing the response in a database accessible to the system and creating a conversation identifier that identifies the user query;
   generating a portal webpage identifier for a response portal webpage in response to the created conversation identifier, and generating a uniform resource locator associated with the response portal webpage identifier;
   communicating the uniform resource locator via the communication channel;
   displaying the response portal webpage when the user accesses the uniform resource locator;
   tracking delivery limits of the communication channel and sending information to the user regarding the response to the user query that is outside the delivery limits of the communication channel to the response portal webpage;
   allowing the user to provide survey answers to a survey wherein the survey contains questions about user satisfaction with the response;
   capturing survey answers from at least two sources:
     i) at least one first answer that includes at least one hashtag from at least one social media interaction, and
     ii) at least one second answer from follow-up social network responses as determined by utilizing a language clustering pattern function to infer language detected within a follow-up answer that falls within a satisfaction range found in the at least one first answer that include the at least one hashtag to compensate for the at least one second answer being unassociated with either the hashtag or the uniform resource locator;
   aggregating the captured survey answers from multiple communication channels and normalizing the aggregated contents of the survey answers to rate the agent performance.

2. The method of claim 1 wherein the survey answers are provided through the communication channel selected from the group consisting of: the response portal webpage, a hashtag response on an online social networking service, a post on the online social networking service and a status update on the online social networking service.

3. The method of claim 1 further comprising correlating the conversation identifiers with a single user.

4. The method of claim 1 wherein the communication channel is a social networking service.

5. The method of claim 1 further comprising allowing the user to search knowledge bases from the response portal webpage.

6. The method of claim 1 further comprising allowing the user to download coupons from the response portal webpage.

7. The method of claim 1 further comprising allowing the user to consume coupons through the response portal webpage.

8. The method of claim 3 further comprising allowing the user to see an entire conversation thread for the user that is linked to the conversation identifiers associated with the user.

9. The method of claim 1 further comprising authenticating an identifier associated with the user and allowing the user to see private messages linked with the user.

10. The method of claim 1 further comprising allowing the user to use the response portal webpage to select the communication channel preferred by the user.

11. The method of claim 1 further comprising allowing the response portal webpage to be crawled by Internet search engines to allow third parties with a problem related to a user problem to access the response portal webpage and to view responses to the user problems.

12. The method of claim 1 further comprising allowing the user and third parties to use the response portal webpage as a self-help support website.

13. The method of claim 1 further comprising:
allowing the user to provide survey answers to the survey wherein the survey contains questions about user satisfaction with knowledge based articles accessible through the response portal webpage; and
using the survey answers to rate relevancy of the knowledge based articles.

14. The method of claim 1 further comprising measuring customer loyalty using the survey answers.

15. A computer system comprising:
a processor;
a memory coupled to the processor;
a display device;
wherein the memory stores a program that assesses and tracks user satisfaction, comments and activity patterns across Internet based social networks, when executed by the processor causes the processor to:
input into memory a user query, the query including a request from a user and a user Internet account;
select a communication channel and the user Internet account and sending a response to the user query;
store the response in a database accessible to the system and creating a conversation identifier that identifies the user query;
generate a portal webpage identifier for a response portal webpage in response to the created conversation identifier, and generating a uniform resource locator associated with the response portal webpage identifier;
communicate the uniform resource locator via the communication channel; and
display the response portal webpage when the user accesses the uniform resource locator;
allow the user to provide survey answers to a survey wherein the survey contains questions about user satisfaction with the response;
aggregate the survey answers from multiple communication channels and normalize the aggregated contents of the survey answers to rate the agent performance;
track the delivery limits of the communication channel and send information to the user regarding the response to the user query that is outside the delivery limits of the communication channel to the response portal webpage;
allow the user to provide survey answers to a survey wherein the survey contains questions about user satisfaction with the response;
capture survey answers from at least two sources:
i) at least one first answer that includes at least one hashtag from at least one social media interaction, and
ii) at least one second answer from follow-up social network responses as determined by utilizing a language clustering pattern function to infer language detected within a follow-up answer that falls within a satisfaction range found in the at least one first answer that include the at least one hashtag to compensate for the at least one second answer being unassociated with either the hashtag or the uniform resource locator; and
aggregate the captured survey answers from multiple communication channels and normalize the aggregated contents of the survey answers to rate the agent performance.

16. The method of claim 1 further comprising:
iii) capturing survey answers from at least one third answer received from the uniform resource locator associated with the response portal webpage identifier; and
aggregating the at least one third answer with the captured survey answers to rate the agent performance.

17. The system of claim 15 further comprising:
iii) capture the survey answers from at least one third answer received from the uniform resource locator associated with the response portal webpage identifier; and
aggregate the at least one third answer with the captured survey answers to rate the agent performance.

\* \* \* \* \*